United States Patent
Benkley et al.

(10) Patent No.: US 8,358,815 B2
(45) Date of Patent: Jan. 22, 2013

(54) METHOD AND APPARATUS FOR TWO-DIMENSIONAL FINGER MOTION TRACKING AND CONTROL

(75) Inventors: Fred George Benkley, Andover, MA (US); David Joseph Geoffroy, Amherst, MA (US); Pallavi Satyan, San Jose, CA (US)

(73) Assignee: Validity Sensors, Inc., San Jose, CA (US)

( * ) Notice: Subject to any disclaimer, the term of this patent is extended or adjusted under 35 U.S.C. 154(b) by 1229 days.

(21) Appl. No.: 11/957,332

(22) Filed: Dec. 14, 2007

(65) Prior Publication Data

US 2008/0240523 A1 Oct. 2, 2008

Related U.S. Application Data

(63) Continuation-in-part of application No. 11/519,383, filed on Sep. 11, 2006, and a continuation-in-part of application No. 11/519,362, filed on Sep. 11, 2006, now Pat. No. 8,165,355, and a continuation-in-part of application No. 11/107,682, filed on Apr. 15, (Continued)

(51) Int. Cl.
*G06K 9/00* (2006.01)

(52) U.S. Cl. ........................................ 382/124

(58) Field of Classification Search ............... None
See application file for complete search history.

(56) References Cited

U.S. PATENT DOCUMENTS

| | | |
|---|---|---|
| 4,151,512 A | 4/1979 | Riganati et al. |
| 4,225,850 A | 9/1980 | Chang et al. |
| 4,310,827 A | 1/1982 | Asai |
| 4,353,056 A | 10/1982 | Tsikos |
| 4,405,829 A | 9/1983 | Rivest et al. |
| 4,525,859 A | 6/1985 | Bowles et al. |

(Continued)

FOREIGN PATENT DOCUMENTS

| | | |
|---|---|---|
| DE | 2213813 A1 | 10/1973 |
| EP | 0929028 A2 | 1/1998 |

(Continued)

OTHER PUBLICATIONS

Wikipedia (Mar. 2003). "Integrated circuit." http://en.wikipedia.org/wiki/Integrated_circuit. Revision as of Mar. 23, 2003.*

(Continued)

*Primary Examiner* — Barry Drennan
(74) *Attorney, Agent, or Firm* — Greenberg Traurig LLP; Cecily Anne O'Regan; William C. Cray

(57) ABSTRACT

Enhanced accuracy finger position and motion sensors devices, algorithms, and methods are disclosed that can be used in a variety of different applications. The sensors can be used in conjunction with partial fingerprint imagers to produce improved fingerprint scanners. The finger motion sensors may also be used (either with or without a partial fingerprint imager) to control electronic devices. When several of these finger motion and position sensors are aligned in different directions, finger motion over a two dimensional surface may be detected. This creates a finger controlled "mouse" computer input device. Motion of a finger along the surface of such sensors may allow a user to control the movement of an indicator on a display screen, and control a microprocessor device. Such techniques are particularly useful for small space constrained devices, such as cell phones, smart cards, music players, portable computers, personal digital accessories, and the like.

26 Claims, 20 Drawing Sheets

Related U.S. Application Data 2005, now Pat. No. 7,463,756, application No. 11/957,332, which is a continuation-in-part of application No. 11/112,338, filed on Apr. 22, 2005, now Pat. No. 8,077,935, and a continuation-in-part of application No. 11/243,100, filed on Oct. 4, 2005, now Pat. No. 7,751,601.

(60) Provisional application No. 60/563,139, filed on Apr. 16, 2004, provisional application No. 60/564,791, filed on Apr. 23, 2004, provisional application No. 60/615,718, filed on Oct. 4, 2004.

U.S. PATENT DOCUMENTS

| Patent No. | | Date | Inventor |
|---|---|---|---|
| 4,550,221 | A | 10/1985 | Mabusth |
| 4,580,790 | A | 4/1986 | Doose |
| 4,758,622 | A | 7/1988 | Gosselin |
| 4,817,183 | A | 3/1989 | Sparrow |
| 5,076,566 | A | 12/1991 | Kriegel |
| 5,109,427 | A | 4/1992 | Yang |
| 5,140,642 | A | 8/1992 | Hsu et al. |
| 5,305,017 | A | 4/1994 | Gerpheide |
| 5,319,323 | A | 6/1994 | Fong |
| 5,325,442 | A | 6/1994 | Knapp |
| 5,420,936 | A | 5/1995 | Fitzpatrick et al. |
| 5,422,807 | A | 6/1995 | Mitra et al. |
| 5,456,256 | A | 10/1995 | Schneider et al. |
| 5,543,591 | A | 8/1996 | Gillespie et al. |
| 5,569,901 | A | 10/1996 | Bridgelall et al. |
| 5,623,552 | A | 4/1997 | Lane |
| 5,627,316 | A | 5/1997 | De Winter et al. |
| 5,650,842 | A | 7/1997 | Maase et al. |
| 5,717,777 | A | 2/1998 | Wong et al. |
| 5,781,651 | A | 7/1998 | Hsiao et al. |
| 5,801,681 | A | 9/1998 | Sayag |
| 5,818,956 | A | 10/1998 | Tuli |
| 5,838,306 | A | 11/1998 | O'Connor |
| 5,848,176 | A | 12/1998 | Harra et al. |
| 5,850,450 | A | 12/1998 | Schweitzer et al. |
| 5,852,670 | A | 12/1998 | Setlak et al. |
| 5,864,296 | A * | 1/1999 | Upton ............ 340/5.53 |
| 5,887,343 | A | 3/1999 | Salatino et al. |
| 5,892,824 | A | 4/1999 | Beatson et al. |
| 5,903,225 | A | 5/1999 | Schmitt et al. |
| 5,915,757 | A | 6/1999 | Tsuyama et al. |
| 5,920,384 | A | 7/1999 | Borza |
| 5,920,640 | A | 7/1999 | Salatino et al. |
| 5,940,526 | A | 8/1999 | Setlak et al. |
| 5,999,637 | A | 12/1999 | Toyoda et al. |
| 6,002,815 | A | 12/1999 | Immega et al. |
| 6,016,355 | A | 1/2000 | Dickinson et al. |
| 6,052,475 | A | 4/2000 | Upton |
| 6,067,368 | A | 5/2000 | Setlak et al. |
| 6,073,343 | A | 6/2000 | Petrick et al. |
| 6,076,566 | A | 6/2000 | Lowe |
| 6,088,585 | A | 7/2000 | Schmitt et al. |
| 6,098,175 | A | 8/2000 | Lee |
| 6,118,318 | A | 9/2000 | Fifield et al. |
| 6,134,340 | A | 10/2000 | Hsu et al. |
| 6,157,722 | A | 12/2000 | Lerner et al. |
| 6,161,213 | A | 12/2000 | Lofstrom |
| 6,175,407 | B1 | 1/2001 | Santor |
| 6,182,076 | B1 | 1/2001 | Yu et al. |
| 6,182,892 | B1 | 2/2001 | Angelo et al. |
| 6,185,318 | B1 | 2/2001 | Jain et al. |
| 6,234,031 | B1 | 5/2001 | Suga |
| 6,241,288 | B1 | 6/2001 | Bergenek et al. |
| 6,259,108 | B1 | 7/2001 | Antonelli et al. |
| 6,289,114 | B1 | 9/2001 | Mainguet |
| 6,317,508 | B1 | 11/2001 | Kramer et al. |
| 6,320,394 | B1 | 11/2001 | Tartagni |
| 6,332,193 | B1 | 12/2001 | Glass et al. |
| 6,333,989 | B1 * | 12/2001 | Borza ............ 382/124 |
| 6,337,919 | B1 | 1/2002 | Dunton |
| 6,346,739 | B1 | 2/2002 | Lepert et al. |
| 6,347,040 | B1 | 2/2002 | Fries et al. |
| 6,360,004 | B1 | 3/2002 | Akizuki |
| 6,362,633 | B1 | 3/2002 | Tartagni |
| 6,392,636 | B1 | 5/2002 | Ferrari et al. |
| 6,399,994 | B2 | 6/2002 | Shobu |
| 6,400,836 | B2 | 6/2002 | Senior |
| 6,408,087 | B1 | 6/2002 | Kramer |
| 6,473,072 | B1 | 10/2002 | Comiskey et al. |
| 6,509,501 | B2 | 1/2003 | Eicken et al. |
| 6,539,101 | B1 | 3/2003 | Black |
| 6,580,816 | B2 | 6/2003 | Kramer et al. |
| 6,597,289 | B2 | 7/2003 | Sabatini |
| 6,643,389 | B1 | 11/2003 | Raynal et al. |
| 6,672,174 | B2 | 1/2004 | Deconde et al. |
| 6,710,461 | B2 | 3/2004 | Chou et al. |
| 6,738,050 | B2 | 5/2004 | Comiskey et al. |
| 6,741,729 | B2 | 5/2004 | Bjorn et al. |
| 6,757,002 | B1 | 6/2004 | Oross et al. |
| 6,766,040 | B1 | 7/2004 | Catalano et al. |
| 6,785,407 | B1 | 8/2004 | Tschudi et al. |
| 6,836,230 | B2 * | 12/2004 | Le Pailleur et al. ........... 341/141 |
| 6,838,905 | B1 | 1/2005 | Doyle |
| 6,886,104 | B1 | 4/2005 | McClurg et al. |
| 6,897,002 | B2 | 5/2005 | Teraoka et al. |
| 6,898,299 | B1 | 5/2005 | Brooks |
| 6,924,496 | B2 | 8/2005 | Manansala |
| 6,937,748 | B1 | 8/2005 | Schneider et al. |
| 6,941,001 | B1 | 9/2005 | Bolle et al. |
| 6,941,810 | B2 | 9/2005 | Okada |
| 6,950,540 | B2 | 9/2005 | Higuchi |
| 6,959,874 | B2 | 11/2005 | Bardwell |
| 6,963,626 | B1 | 11/2005 | Shaeffer et al. |
| 6,970,584 | B2 | 11/2005 | O'Gorman et al. |
| 6,980,672 | B2 | 12/2005 | Saito et al. |
| 6,983,882 | B2 | 1/2006 | Cassone |
| 7,013,030 | B2 | 3/2006 | Wong et al. |
| 7,020,591 | B1 | 3/2006 | Wei et al. |
| 7,030,860 | B1 | 4/2006 | Hsu et al. |
| 7,035,443 | B2 | 4/2006 | Wong |
| 7,040,561 | B2 | 5/2006 | Wong |
| 7,042,535 | B2 | 5/2006 | Katoh et al. |
| 7,043,644 | B2 | 5/2006 | DeBruine |
| 7,046,230 | B2 | 5/2006 | Zadesky et al. |
| 7,064,743 | B2 * | 6/2006 | Nishikawa ........... 345/157 |
| 7,099,496 | B2 | 8/2006 | Benkley |
| 7,110,577 | B1 | 9/2006 | Tschud |
| 7,113,622 | B2 | 9/2006 | Hamid |
| 7,126,389 | B1 | 10/2006 | McRae et al. |
| 7,129,926 | B2 * | 10/2006 | Mathiassen et al. ........... 345/157 |
| 7,136,514 | B1 | 11/2006 | Wong |
| 7,146,024 | B2 | 12/2006 | Benkley |
| 7,146,026 | B2 | 12/2006 | Russon et al. |
| 7,146,029 | B2 | 12/2006 | Manansala |
| 7,184,581 | B2 * | 2/2007 | Johansen et al. ............... 382/124 |
| 7,190,816 | B2 | 3/2007 | Mitsuyu et al. |
| 7,194,392 | B2 | 3/2007 | Tuken et al. |
| 7,197,168 | B2 | 3/2007 | Russo |
| 7,200,250 | B2 | 4/2007 | Chou |
| 7,251,351 | B2 | 7/2007 | Mathiassen et al. |
| 7,258,279 | B2 | 8/2007 | Schneider et al. |
| 7,260,246 | B2 | 8/2007 | Fujii |
| 7,263,212 | B2 | 8/2007 | Kawabe |
| 7,263,213 | B2 | 8/2007 | Rowe |
| 7,289,649 | B1 | 10/2007 | Walley et al. |
| 7,290,323 | B2 | 11/2007 | Deconde et al. |
| 7,308,121 | B2 * | 12/2007 | Mathiassen et al. ........... 382/124 |
| 7,308,122 | B2 | 12/2007 | McClurg et al. |
| 7,321,672 | B2 | 1/2008 | Sasaki et al. |
| 7,356,169 | B2 | 4/2008 | Hamid |
| 7,360,688 | B1 | 4/2008 | Harris |
| 7,369,685 | B2 | 5/2008 | DeLeon |
| 7,379,569 | B2 | 5/2008 | Chikazawa et al. |
| 7,409,876 | B2 | 8/2008 | Ganapathi et al. |
| 7,412,083 | B2 | 8/2008 | Takahashi |
| 7,424,618 | B2 | 9/2008 | Roy et al. |
| 7,447,339 | B2 | 11/2008 | Mimura et al. |
| 7,447,911 | B2 | 11/2008 | Chou et al. |
| 7,460,697 | B2 | 12/2008 | Erhart et al. |
| 7,463,756 | B2 | 12/2008 | Benkley |
| 7,505,611 | B2 | 3/2009 | Fyke |

| | | |
|---|---|---|
| 7,505,613 B2 | 3/2009 | Russo |
| 7,565,548 B2 | 7/2009 | Fiske et al. |
| 7,574,022 B2 | 8/2009 | Russo |
| 7,643,950 B1 | 1/2010 | Getzin et al. |
| 7,646,897 B2 | 1/2010 | Fyke |
| 7,681,232 B2 | 3/2010 | Nordentoft et al. |
| 7,689,013 B2 | 3/2010 | Shinzaki |
| 7,706,581 B2 | 4/2010 | Drews et al. |
| 7,733,697 B2 | 6/2010 | Picca et al. |
| 7,751,601 B2 | 7/2010 | Benkley |
| 7,843,438 B2 | 11/2010 | Onoda |
| 7,899,216 B2 | 3/2011 | Watanabe et al. |
| 7,953,258 B2 | 5/2011 | Dean et al. |
| 8,005,276 B2 | 8/2011 | Dean et al. |
| 8,077,935 B2 | 12/2011 | Geoffroy et al. |
| 8,107,212 B2 | 1/2012 | Nelson et al. |
| 8,115,530 B2 | 2/2012 | Lewis et al. |
| 8,131,026 B2 | 3/2012 | Benkley et al. |
| 2001/0043728 A1 | 11/2001 | Kramer et al. |
| 2002/0025062 A1 | 2/2002 | Black |
| 2002/0061125 A1 | 5/2002 | Fujii |
| 2002/0064892 A1 | 5/2002 | Lepert et al. |
| 2002/0067845 A1* | 6/2002 | Griffis ............... 382/107 |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0181749 A1 | 12/2002 | Matsumoto et al. |
| 2003/0002717 A1 | 1/2003 | Hamid |
| 2003/0002719 A1* | 1/2003 | Hamid et al. ............... 382/124 |
| 2003/0021495 A1 | 1/2003 | Cheng |
| 2003/0035570 A1* | 2/2003 | Benkley, III ............... 382/124 |
| 2003/0063782 A1 | 4/2003 | Acharya et al. |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0102874 A1 | 6/2003 | Lane et al. |
| 2003/0123714 A1 | 7/2003 | O'Gorman et al. |
| 2003/0123715 A1* | 7/2003 | Uchida ............... 382/124 |
| 2003/0141959 A1 | 7/2003 | Keogh et al. |
| 2003/0147015 A1 | 8/2003 | Katoh et al. |
| 2003/0161510 A1 | 8/2003 | Fuji |
| 2003/0161512 A1 | 8/2003 | Mathiassen et al. |
| 2003/0169228 A1* | 9/2003 | Mathiassen et al. ............ 345/156 |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0109835 A1 | 5/2005 | Jacoby et al. |
| 2005/0110103 A1 | 5/2005 | Setlak |
| 2005/0111708 A1 | 5/2005 | Chou |
| 2005/0123176 A1 | 6/2005 | Ishil et al. |
| 2005/0136200 A1 | 6/2005 | Durell et al. |
| 2005/0139656 A1 | 6/2005 | Arnouse |
| 2005/0139685 A1 | 6/2005 | Kozlay |
| 2005/0162402 A1 | 7/2005 | Watanachote |
| 2005/0169503 A1 | 8/2005 | Howell et al. |
| 2005/0210271 A1 | 9/2005 | Chou et al. |
| 2005/0219200 A1 | 10/2005 | Weng |
| 2005/0220329 A1 | 10/2005 | Payne et al. |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0006224 A1 | 1/2006 | Modi |
| 2006/0055500 A1 | 3/2006 | Burke et al. |
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Fukushige et al. |
| 2006/0187200 A1 | 8/2006 | Martin |
| 2006/0210082 A1 | 9/2006 | Devadas et al. |
| 2006/0214512 A1 | 9/2006 | Iwata |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0271793 A1 | 11/2006 | Devadas et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0180261 A1 | 8/2007 | Akkermans et al. |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0248249 A1 | 10/2007 | Stoianov |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0069412 A1 | 3/2008 | Champagne et al. |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott et al. |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0201265 A1 | 8/2008 | Hewton |
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1 | 9/2008 | Saito et al. |
| 2008/0226132 A1 | 9/2008 | Gardner |
| 2008/0244277 A1 | 10/2008 | Orsini et al. |
| 2008/0267462 A1 | 10/2008 | Nelson et al. |
| 2008/0279373 A1 | 11/2008 | Erhart et al. |
| 2009/0130369 A1 | 5/2009 | Huang et al. |

| | | | |
|---|---|---|---|
| 2009/0153297 A1 | 6/2009 | Gardner | |
| 2009/0154779 A1 | 6/2009 | Satyan et al. | |
| 2009/0155456 A1 | 6/2009 | Benkley et al. | |
| 2009/0169071 A1 | 7/2009 | Bond et al. | |
| 2009/0174974 A1 | 7/2009 | Huang et al. | |
| 2009/0237135 A1 | 9/2009 | Ramaraju et al. | |
| 2009/0252384 A1 | 10/2009 | Dean et al. | |
| 2009/0252385 A1 | 10/2009 | Dean et al. | |
| 2009/0252386 A1 | 10/2009 | Dean et al. | |
| 2009/0279742 A1 | 11/2009 | Abiko | |
| 2009/0319435 A1 | 12/2009 | Little et al. | |
| 2009/0324028 A1 | 12/2009 | Russo | |
| 2010/0026451 A1 | 2/2010 | Erhart et al. | |
| 2010/0045705 A1 | 2/2010 | Vertegaal et al. | |
| 2010/0083000 A1 | 4/2010 | Kesanupalli et al. | |
| 2010/0119124 A1 | 5/2010 | Satyan | |
| 2010/0123675 A1 | 5/2010 | Ippel | |
| 2010/0127366 A1 | 5/2010 | Bond et al. | |
| 2010/0176823 A1 | 7/2010 | Thompson et al. | |
| 2010/0176892 A1 | 7/2010 | Thompson et al. | |
| 2010/0177940 A1 | 7/2010 | Thompson et al. | |
| 2010/0180136 A1 | 7/2010 | Thompson et al. | |
| 2010/0189314 A1 | 7/2010 | Benkley et al. | |
| 2010/0208953 A1 | 8/2010 | Gardner et al. | |
| 2010/0244166 A1 | 9/2010 | Shibuta et al. | |
| 2010/0272329 A1 | 10/2010 | Benkley | |
| 2010/0284565 A1 | 11/2010 | Benkley et al. | |
| 2011/0002461 A1 | 1/2011 | Erhart et al. | |
| 2011/0018556 A1 | 1/2011 | Le et al. | |
| 2011/0102567 A1 | 5/2011 | Erhart | |
| 2011/0102569 A1 | 5/2011 | Erhart | |
| 2011/0182486 A1 | 7/2011 | Valfridsson et al. | |
| 2011/0214924 A1 | 9/2011 | Perezselsky et al. | |
| 2011/0267298 A1 | 11/2011 | Erhart et al. | |
| 2011/0298711 A1 | 12/2011 | Dean et al. | |
| 2011/0304001 A1 | 12/2011 | Erhart et al. | |
| 2012/0044639 A1 | 2/2012 | Garcia | |

FOREIGN PATENT DOCUMENTS

| | | |
|---|---|---|
| EP | 0905646 A1 | 3/1999 |
| EP | 0905646 A1 * | 3/1999 |
| EP | 0973123 A1 | 1/2000 |
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1538548 A2 | 6/2005 |
| EP | 1624399 B1 | 2/2006 |
| EP | 1939788 A1 | 7/2008 |
| GB | 2331613 A | 5/1999 |
| GB | 2480919 | 12/2011 |
| JP | 04158434 A2 | 6/1992 |
| JP | 2005242856 | 9/2005 |
| WO | WO 90/03620 A1 | 4/1990 |
| WO | WO 98/58342 | 12/1998 |
| WO | WO 99/28701 A1 | 6/1999 |
| WO | WO 99/43258 A1 | 9/1999 |
| WO | WO 01/22349 A1 | 3/2001 |
| WO | WO 01/94902 A2 | 12/2001 |
| WO | WO 01/94902 A3 | 12/2001 |
| WO | WO 01/95304 A1 | 12/2001 |
| WO | WO 01/95304 A1 * | 12/2001 |
| WO | WO 02/011066 A1 | 2/2002 |
| WO | WO 02/11066 A1 * | 2/2002 |
| WO | WO 02/47018 A2 | 6/2002 |
| WO | WO 02/47018 A3 | 6/2002 |
| WO | WO 02/061668 A1 | 8/2002 |
| WO | WO 02/077907 A1 | 10/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/0104012 A1 | 11/2005 |
| WO | WO 2005/106774 A2 | 11/2005 |
| WO | WO 2005/106774 A3 | 11/2005 |
| WO | WO 2006/040724 | 4/2006 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079257 A1 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/053797 A1 | 5/2011 |

OTHER PUBLICATIONS

Matsumoto et al., Impact of Artificial "Gummy" Fingers on Fingerprint Systems, SPIE 4677 (2002), reprinted from cryptome.org.

Maltoni, "Handbook of Fingerprint Recognition", XP002355942 Springer, New York, USA, Jun. 2003 pp. 65-69.

Vermasan, et al., "A500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet: URL:http://alexandria.tue.nl/extral/afstversl/wsk-i/hgt2008.pdf [retrieved on Mar. 29, 2011] *pp. 127-134, paragraph 6.2*.

Gassend, et al., "Controlled Physical Random Functions", In Proceedings of the 18th Annual Computer Security Conference, Las Vegas, Nevada, Dec. 12, 2002.

Wikipedia (Mar. 2003). "Integrated Circuit," http://en.wikipedia.org/wiki/integrated_circuit. Revision as of Mar. 23, 2003.

Wikipedia (Dec. 2006). "Integrated circuit" Revision as of Dec. 10, 2006. http://en.widipedia.org/wiki/Integrated_circuit.

BELLAGIODESIGNS.COM (Internet Archive Wayback Machine, www.bellagiodesigns.com date: Oct. 29, 2005).

Closed Loop Systems, The Free Dictionary, http://www.thefreedictionary.com/closed-loop+system (downloaded Dec. 1, 2011).

Feedback: Electronic Engineering, Wikipedia, p. 5 http://en.wikipedia.org/wiki/Feedback#Electronic_engineering (downloaded Dec. 1, 2011).

Galy et al. (Jul. 2007) "A full fingerprint verification system for a single-line sweep sensor." IEEE Sensors J., vol. 7 No. 7, pp. 1054-1065.

* cited by examiner

METHOD AND APPARATUS FOR TWO-DIMENSIONAL FINGER MOTION TRACKING AND CONTROL

RELATED APPLICATIONS

This application is related to U.S. Non-Provisional application Ser. No. TBD, filed Dec. 14, 2007, entitled "Method and Apparatus for Fingerprint Image Reconstruction," and U.S. Non-Provisional application Ser. No. TBD, filed Dec. 14, 2007, entitled "Method and Algorithm for Accurate Finger Motion Tracking."

This application is a continuation in part of, and claims the priority benefit of, U.S. Non-Provisional application Ser. No. 11/519,383, filed Sep. 11, 2006, and also a continuation in part of U.S. Non-Provisional application Ser. No. 11/519,362, filed Sep. 11, 2006.

This application is a continuation in part of, and claims the priority benefit of, U.S. Non-Provisional application Ser. No. 11/107,682, filed Apr. 15, 2005. U.S. Non-Provisional patent application Ser. No. 11/107,682 claimed the priority benefit of U.S. Provisional Patent Application No. 60/563,139, filed Apr. 16, 2004.

This application is also a continuation in part of, and claims the priority benefit of, U.S. Non-Provisional patent application Ser. No. 11/112,338, filed Apr. 22, 2005. U.S. Non-Provisional patent application Ser. No. 11/112,338 claimed the priority benefit of U.S. Provisional Application 60/564,791, filed Apr. 23, 2004.

This application is also a continuation in part of, and claims the priority benefit of, U.S. Non-Provisional patent application Ser. No. 11/243,100, filed Oct. 4, 2005. U.S. Non-Provisional patent application Ser. No. 11/243,100 claimed the priority benefit of U.S. Provisional Patent Application 60/615,718, filed Oct. 4, 2004.

BACKGROUND

The invention relates generally to technology for sensing and recording finger motion, fingerprints and, more particularly to systems, devices and methods for finger motion tracking both alone, and in combination with fingerprint image processing and navigation operations.

Partial fingerprint scanners are becoming popular for a wide variety of security applications. In contrast to "all at once" fingerprint scanners, which capture an image of an entire fingerprint at the same time, partial fingerprint sensing devices use a sensing area that is smaller than the fingerprint area to be imaged. By imaging only a portion of a fingerprint at any given time, the size and cost of a partial fingerprint sensor can be made considerably smaller and cheaper than that of a full fingerprint sensor. However to capture a full fingerprint image, the user must move his finger and "swipe" it across the sensing zone of the partial finger print sensor.

Various types of partial fingerprint readers exist. Some work by optical means, some by pressure sensor means, and others by capacitance sensing means or radiofrequency sensing means.

For example, one common configuration used for a fingerprint sensor is a one or two dimensional array of CCD (charge coupled devices) or C-MOS circuit sensor elements (pixels). These components are embedded in a sensing surface to form a matrix of pressure sensing elements that generate signals in response to pressure app lied to the surface by a finger. These signals are read by a processor and used to reconstruct the fingerprint of a user and to verify identification.

Other devices include one or two dimensional arrays of optical sensors that read light reflected off of a person's finger and onto an array of optical detectors. The reflected light is converted to a signal that defines the fingerprint of the finger analyzed and is used to reconstruct the fingerprint and to verify identification.

Many types of partial fingerprint scanners are comprised of linear (1 dimensional) arrays of sensing elements (pixels). These one dimensional sensors create a two dimensional image of a fingerprint through the relative motion of the finger pad relative to the sensor array.

One class of partial fingerprint sensors that are particularly useful for small device applications are deep finger penetrating radio frequency (RF) based sensors. These are described in U.S. Pat. Nos. 7,099,496; 7,146,024; and US Publication Nos. US 2005-0244038 A1, US 2005-0244039 A1, US 2006-0083411 A1, and US 2007-0031011 A1, and the contents of these patents and patent applications are incorporated herein by reference. These types of sensors are commercially produced by Validity Sensors, Inc, San Jose Calif. This class of sensor mounts the sensing elements (usually arranged in a one dimensional array) on a thin, flexible, and environmentally robust support, and the IC used to drive the sensor in a protected location some distance away from the sensing zone. Such sensors are particularly advantageous in applications where small sensor size and sensor robustness are critical.

The Validity fingerprint sensors measure the intensity of electric fields conducted by finger ridges and valleys, such as deep finger penetrating radio frequency (RF) based sensing technology, and use this information to sense and create the fingerprint image. These devices create sensing elements by creating a linear array composed of many miniature excitation electrodes, spaced at a high density, such as a density of approximately 500 electrodes per inch. The tips of these electrodes are separated from a single sensing electrode by a small sensor gap. The electrodes are electrically excited in a progressive scan pattern and the ridges and valleys of a finger pad alter the electrical properties (usually the capacitive properties) of the excitation electrode-sensing electrode interaction, and this in turn creates a detectable electrical signal. The electrodes and sensors are mounted on thin flexible printed circuit support, and these electrodes and sensors are usually excited and the sensor read by an integrated circuit chip (scanner chip, driver chip, scan IC) designed for this purpose. The end result is to create a one dimensional "image" of the portion of the finger pad immediately over the electrode array and sensor junction.

As the finger surface is moved across the sensor, portions of the fingerprint are sensed and captured by the device's one dimensional scanner, creating an array of one dimensional images indexed by order of data acquisition, and/or alternatively annotated with additional time and/or finger pad location information. Circuitry, such as a computer processor or microprocessor, then creates a full two-dimensional fingerprint image by creating a mosaic of these one dimensional partial fingerprint images.

Often the processor will then compare this recreated two dimensional full fingerprint, usually stored in working memory, with an authorized fingerprint stored in a fingerprint recognition memory, and determine if there is a match or not. Software to fingerprint matching is disclosed in U.S. Pat. Nos. 7,020,591 and 7,194,392 by Wei et. al., and is commercially available from sources such as Cogent systems, Inc., South Pasadena, Calif.

If the scanned fingerprint matches the record of an authorized user, the processor then usually unlocks a secure area or computer system and allows the user access. This enables various types of sensitive areas and information (financial data, security codes, etc.), to be protected from unauthorized users, yet still be easily accessible to authorized users.

The main drawback of partial fingerprint sensors is that in order to obtain a valid fingerprint scan, the user must swipe his or her finger across the sensor surface in a relatively uniform manner. Unfortunately, due to various human factors issues, this usually isn't possible. In the real world, users will not swipe their fingers with a constant speed. Some will swipe more quickly than others, some may swipe at non-uniform speeds, and some may stop partially through a scan, and then resume. In order to account for this type of variation, modern partial fingerprint sensors often incorporate finger position sensors to determine, relative to the fingerprint sensor, how the overall finger position and speed varies during a finger swipe.

One type of finger position indicator, represented by U.S. Pat. No. 7,146,024, and US Publication Nos. US 2005-0244038 A1, US 2005-0244039 A1 (the contents of which are incorporated herein by reference) detects relative finger position using a long array of electrical drive plate sensors. These plates sense the bulk of a finger (rather than the fine details of the fingerprint ridges), and thus sense the relative position of the finger relative to the linear array used for fingerprint sensing. A second type of fingerprint position indicator, represented by U.S. patent publication US 2007-0031011 A1 (the contents of which are incorporated herein by reference), uses two linear partial fingerprint sensors, located about 400 microns apart. The two linear sensors use the slight timing differences that occur when a fingerprint swipe first hits one sensor and then the other sensor to detect when a fingerprint edge passes over the sensors. This technique can also detect relative speed of passage over the two partial sensors. This type of information can be used to deduce overall finger location during the course of a fingerprint swipe.

Another device is described in U.S. Pat. No. 6,002,815 of Immega, et al. The technique used by the Immega device is based on the amount of time required for the finger to travel a fixed distance between two parallel image lines that are oriented perpendicular to the axis of motion.

Still another technique is described in U.S. Pat. No. 6,289,114 of Mainguet. A device utilizing this method reconstructs fingerprints based on sensing and recording images taken of rectangular slices of the fingerprint and piecing them together using an overlapping mosaic algorithm.

In either case, once finger position is known, each of the one-dimensional partial fingerprint images can then be annotated with additional (and optional) time data (time stamp) or finger (finger tip, finger pad, fingerprint location) location data (location stamp). This optional annotation information, which supplements the "order of data acquisition" that would normally be used to keep track of the multiple stored partial fingerprint images in memory, can be used to help to correct distortions (artifacts) when the various one dimensional partial images are assembled into a full two dimensional fingerprint image.

For example, if the user momentarily stops moving the finger during the finger swipe, the system will generate a series of nearly identical partial (one dimensional) fingerprint images. These images will have different orders of acquisition, and differing time stamps, which could confuse a processor when it attempts to create a correct two dimensional full fingerprint image. However if the fingerprint scanner also has a finger position sensor, the finger location data stamp associated with these nearly identical one dimensional partial fingerprint images will provide evidence that the finger stopped because the finger location data linked to these various one-dimensional partial fingerprint images will be almost the same. The computer processor that reassembles the partial fingerprint images into the complete fingerprint image can be instructed or programmed to also analyze the finger position (location) data, and perform appropriate image corrections when the location data shows that the finger paused during a scan.

U.S. Pat. Nos. 7,099,496, 7,146,024, and US Publication Nos. US 20050244038 and US 20050244039 describe a combination fingerprint sensor and finger location apparatus, and the contents of these application are included herein by reference. FIGS. 11-18 of U.S. Pat. No. 7,099,496 show various ways in which finger location sensors and partial fingerprint images can be packaged together to produce a system capable of reproducing an entire fingerprint. FIG. 11 of U.S. Pat. No. 7,099,496, shows a fingerprint sensor that contains both a fingerprint imager (110), (114), (116), (118) and fingerprint location pickup plates (112), and (1120) through (1162).

Similarly application US Publication No. US 2005-0244038 A1, FIG. 1 shows an overview of how a finger position sensor (112) and a partial fingerprint sensor (swiped image sensor) (110) can be integrated into an overall fingerprint scanner, and FIGS. 5 through 11 and 13 through 16 show how a finger moves over a series of sensor plates in the finger position sensor in the course of a finger print swipe.

One drawback of these earlier approaches was that the system was still too sensitive to individual variations in user technique. One way to address this issue, discussed in application US Publication US 20050244039A1, is to assist the user to produce a finger swipe that the system can properly read by giving the user visual or audio feedback as to if the finger swipe produced finger location and speed data that was readable by the system. This way, the user can be encouraged optimize his or her finger swipe technique. However alternative approaches, such as improved signal analysis techniques that make the system more tolerant to variations in user technique, either with or without audio or visual user feedback are also desirable.

One of the reasons why these earlier approaches were overly sensitive to variations in use technique is that the systems were not accurate enough. In a rate based sensor, noise can occur when the sensor that is configured to detect the finger and take a reading of finger features is unable to accurately detect the location and motion of the finger while it is being swiped. The result can be noise, such as electronic noise, resulting from a transition of the finger from one sensor element to another. As a result, the finger motion rate calculation is not totally accurate because the signal noise occurring from one sensor element to another creates uncertainty with respect to the location and timing at which a finger transitions from one sensor to another.

Therefore, there exists a need in the art to more accurately sense finger swiping motion across a fingerprint sensor and to accurately calculate the speed and location of the finger that is in motion across the sensor. There also exists a great need in the art for a more efficient means to accurately sense and capture fingerprints on portable microprocessor controlled devices (e.g. cell phones, smart cards, PDA's, laptop computers, MP3 players, and the like). There is also a need for more convenient and efficient ways to provide navigation and control operations on such portable devices. As will be seen, the invention provides for these multiple needs in an elegant manner.

BRIEF SUMMARY OF THE INVENTION

Further improvements in the finger location and movement sensing technology previously disclosed in U.S. Pat. Nos.

7,099,496 and 7,146,024, and also Publication Nos. US 20050244038 and US 20050244039 that are commonly assigned to applicant and incorporated herein by reference, are possible, and some of these additional improvements are described herein. In particular, the present invention teaches improved signal analysis techniques that can enable finger locations and movement during a finger swipe for a fingerprint scan to be determined with improved accuracy and precision, greater resistance to noise (false signals), and over a wider variety of different finger swipe techniques. The present invention also teaches techniques to use this improved information to produce more accurate fingerprint images.

The motion of a finger as it is being swiped across various sensor elements or plates generates noise as the finger transitions from one sensing plate to another plate. Finger motion may be detected by analyzing the sensor signals as a function of time, detecting stable regions of the signals, followed by regions where the sensor signal becomes distorted or noisy. This will usually define finger motion from one sensor element to the other. The problem, however, is that the noisy area is both broad and poorly defined, and this leads to inaccurate results. This is particularly true when the finger being swiped across the sensor changes in velocity or direction. This commonly happens with different types of users, each of whom may have their own unique techniques. Alternative algorithms that determine finger position and movement with higher accuracy are disclosed, and these algorithms in turn allow finger motion sensors to be produced that can track small variations in finger position and velocity with higher degrees of accuracy.

These enhanced accuracy finger position and motion sensors can be used in a greater variety of different applications. In one type of application, these higher accuracy finger motion sensors can be used in conjunction with partial fingerprint scanners to produce improved fingerprint imagers that function with greater robustness and accuracy. In a second type of application, these higher accuracy finger motion sensors may be used (either with or without a partial fingerprint imager) to control electronic devices. When several of these finger motion and position sensors are aligned in different directions, finger motion over a two dimensional surface may be detected. This allows a new type of finger controlled "mouse" computer input device to be created. Motion of a finger along the surface of such sensors may allow a user to control the movement of an indicator on a display screen, and control a microprocessor device. Such techniques are particularly useful for small space constrained devices, such as cell phones, smart cards, music players, portable computers, personal digital accessories, and the like.

DETAILED DESCRIPTION

The techniques discussed here can generally be used with the sensing circuits previously described in U.S. Pat. Nos. 7,099,496 and 7,146,024, and also U.S. Publication Nos. US 2005-0244038A1 and US 2005-0244039A1 that are commonly assigned to applicant and incorporated herein by reference. Please see these applications for a more detailed discussion of the electronic elements. The present invention is focused on signal analysis techniques, methods, and algorithms, and improved fingerprint sensors and navigational devices that use these previously disclosed finger position sensing devices. Thus the present application will not reiterate the details of these previously discussed electrical circuits unless they are relevant to the present invention.

Figure 1A:
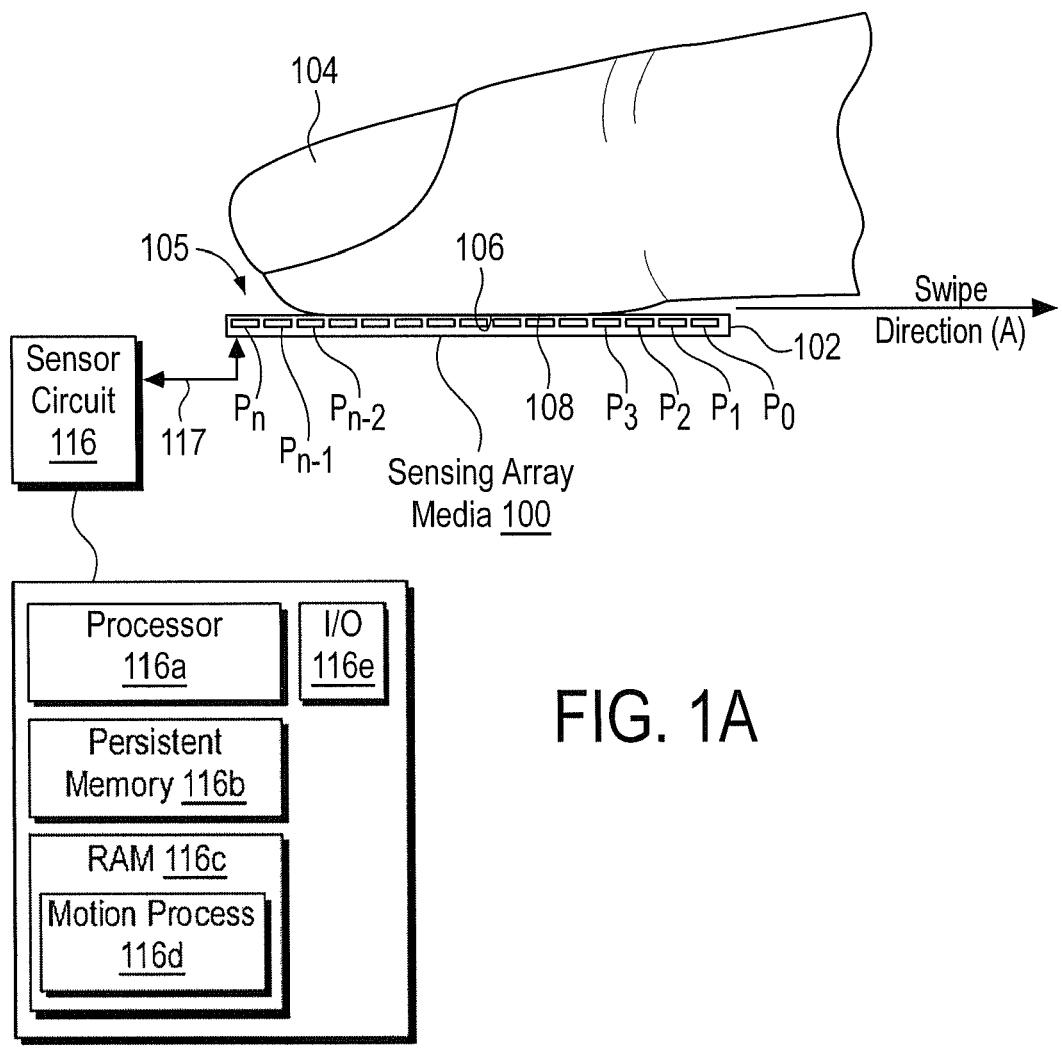
FIG. 1A is a diagrammatic view of a multiple detection element (plate) finger motion sensor.

Referring to FIG. 1A, a side diagrammatic view of a finger position sensor in contact with a finger is illustrated according to the invention. The sensing array (sensing array medium) (100) is illustrated in somewhat of a side diagrammatic cut-away view that illustrates the individual sensing plates $P_n$, $P_{n-1}$, $P_{n-2}$, ... $P_3$, $P_2$, $P_1$ and $P_0$.

In operation by a user, the finger (104) is swiped against a top surface (105) of the sensing array, where the finger surface (106) is physically juxtaposed against surface of the individual plates, $P_n$ through $P_0$ and a the location and movement of the bulk of the finger is captured by the sensing array. Normally, a partial fingerprint scanner that captures a more detailed image of a portion of the fingerprint will also be present (see, for example, present FIG. 1I, FIGS. 3 and 4, and FIGS. 5-8 of Publication US2005-0244038A1), but for simplicity, this is not shown in this figure.

The sensing array has a combination of individual sensing elements that are used for sensing the presence and location of the bulk of the finger surface (106) when it is in contact with the surface (105) of the sensing array. These individual elements can be used to sense the presence, location, and motion of the bulk of the finger with respect to the sensing array surface (105). This information can be used to determine the presence and motion of the finger skin (which holds the fingerprint) (106) with respect to sensing array surface (105), but do not capture an image of the fingerprint itself. This is done by the partial fingerprint imaging sensors (not shown).

This bulk finger motion and location information, together with partial fingerprint images obtained by the fingerprint imager, is used to reconstruct a captured image of the fingerprint surface on the underside of the finger (106) for use in authorizing a user by identifying a fingerprint with a stored version of the user's fingerprint.

Thus when finger (104) is moved in the swipe direction (A), the sensor elements (100) can detect the finger's presence, velocity, acceleration, and direction. Depending upon the particular application, this information can be used in different ways. In some applications, only finger velocity information may be desired. In other applications, finger acceleration and direction may also be desired in order to allow a more complete image of the total fingerprint to be reconstructed from a mosaic of partial fingerprint images. Here, speed, acceleration and direction information can help correct for distortions that may occur if the finger is moved in an abnormal or unpredictable direction.

In another application, this information can be used for navigational applications, can and be used somewhat like a computer "mouse" to help the user command a microprocessor equipped computerized device.

Typically the sensing array (100) is connected to a sensor circuit (116), often by link (117) such as a wire connection or flexible circuit board. Using a sensor circuit (116) that is physically separated from the array (100) allows the sensor circuitry, which may be delicate or prone to picking up environmental noise, to be placed in a more protected or convenient location, and can help improve system robustness.

The sensor circuit (116) may include a processor (116a) and also persistent memory (116b) for storing general system process software and instructions executable by the processor. The sensor circuit may also include memory that can be read and written to such as RAM (116c). Motion process software (116d) may be included in the RAM or persistent memory (116b) (typically this software will require at least some RAM to function).

The motion process software (116d), when executed by the processor (116a), can activate the sensing array and interpret signals from the array via I/O (116e). This allows the processor to receive data from the sensing array as a fingerprint surface (106) is swiped across the surface (105). As previously discussed, such data may include finger presence, location, speed, acceleration, and direction. As previously discussed, this data can be used to determine the finger location where a partial fingerprint sensor (not shown) has received a partial fingerprint image, and using this data, a series of partial fingerprint images can be reassembled into a mosaic representative of a complete fingerprint image. In this diagram, the partial fingerprint imager (not shown) is located proximal to the sensing array medium (100).

Here, improved motion process software is described that enables finger location and speed to be determined with superior accuracy and superior resistance to variations in user technique. In order to describe how this improved motion process software operates, the system will be described in further detail.

In order to properly analyze the signal generated by the various individual sensing plates $P_n$, $P_{n-1}$, $P_{n-2}$, ... $P_3$, $P_2$, $P_1$ and $P_0$ as the finger moves across these plates, a significant amount of signal analysis must be done. In particular, the data from the various plates must be properly interpreted, and then properly meshed with the data from a partial fingerprint sensor in order to generate a usable result.

Figure 1B:
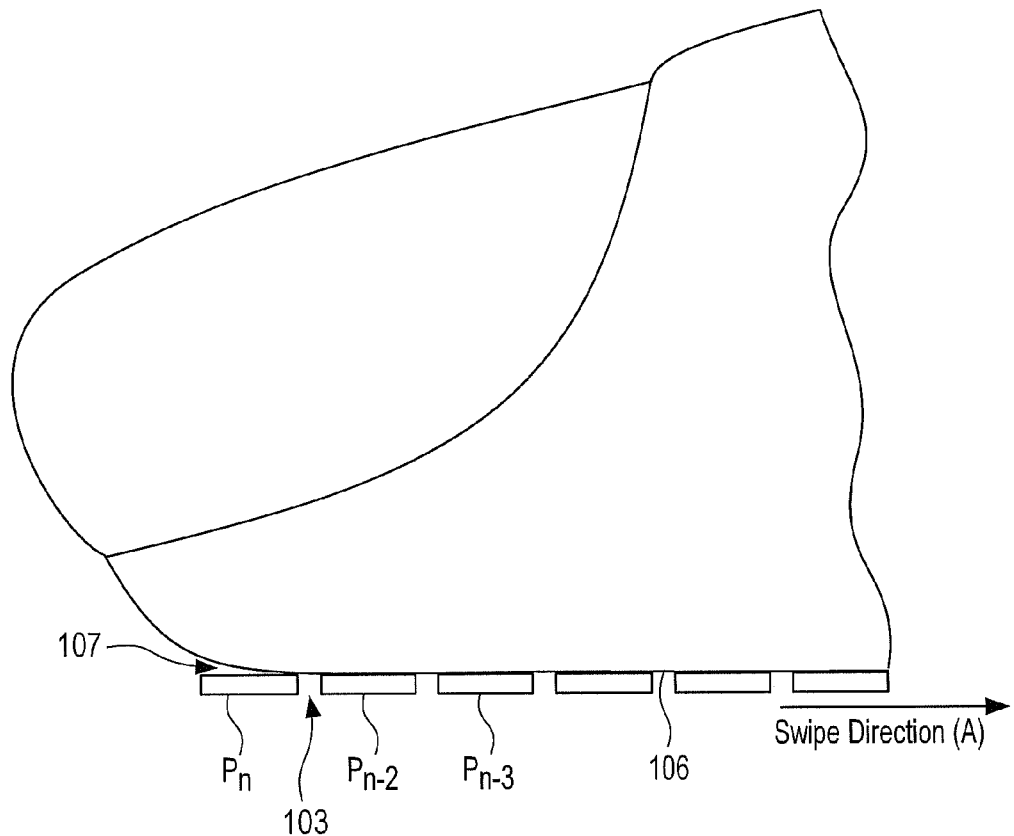
FIG. 1B shows a close up of a finger surface as it contacts various detection elements (plates) of the finger motion sensor.

FIG. 1B shows a close up close up side view of a finger being swiped across the individual sensing elements of the sensing array. The fingerprint surface (106) is swiped in direction (A) across the individual sensing elements $P_{n-1}$, $P_{n-2}$ and $P_{n-3}$. There are gaps between the different sensing elements (103), and the fingerprint surface (106) moves from one sensing element to another.

In order to determine the location of the fingertip (107), the processor needs to receive a signal that indicates a finger transfer from one sensor plate to another. Although the analog signal data from the various individual sensing elements could be rounded off or truncated to produce simple binary "on plate" or "off plate" signals (that is, is the finger "on" or "off" sensing element $P_n$), as was done with some previous implementations, such a low resolution approach discards important information. Much useful information can also be found by analyzing slight variations in the plate signals (that is, digitizing the analog signal generated by the plates to a higher degree of precision), and then using this information, together with time of acquisition data and sensor plate location data, to determine finger position and movement more precisely. Here, techniques to do this more precise analysis are described.

Figure 1C:
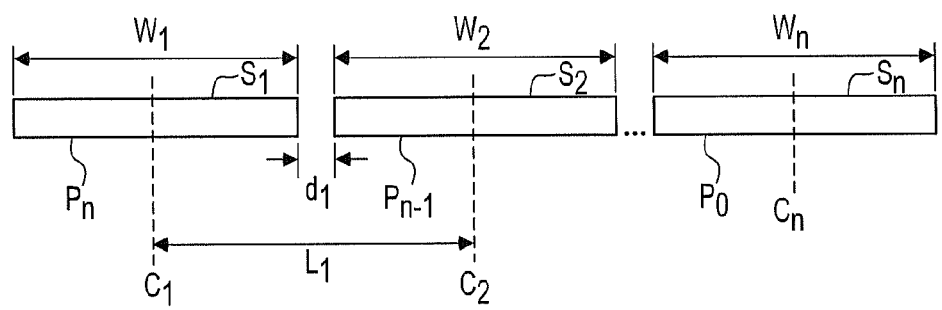
FIG. 1C shows the approximate dimensions of the individual sensing elements (plates) of a finger motion sensor array.

Referring to FIG. 1C, a more detailed view of the individual sensing elements is illustrated. Each element has a fixed width, "w", and each element has a distance from an adjacent element, "d". From the centers, "c", of each sensing element to an adjacent element is a center length "L", which is the distance from one center to the center of an adjacent element. As illustrated, element $P_n$ has a width, "$w_1$", and a center, "$c_1$". The distance between this individual sensing element and the next sensing element $P_{n-1}$ is "$d_1$". The next sensing element $P_{n-1}$ has a width "$w_2$" and a center of "$c_2$". The center point length between the two elements is "$L_1$".

In essence then, the signal analysis problem is one of using the electrical signals generated by the various sensing plates to determine the speed of motion of the fingerprint surface, and its location, with respect to the surfaces $s_1, S_2 \ldots s_n$ of the respective sensing elements. By carefully analyzing the intensity and timing of these electrical signals, and using the techniques taught herein, the position and movement of the finger may be determined with improved accuracy.

In order to facilitate this discussion, the dimensions of the sensor array will be defined. Here, the fingerprint surface transfers from one sensor element to another between the gaps "d", the finger surface moves between each and every plate from plates $P_n$ through $P_0$, and these plates have a width $w_n$, a surface $s_n$ and a center point $c_n$.

Figure 1D:
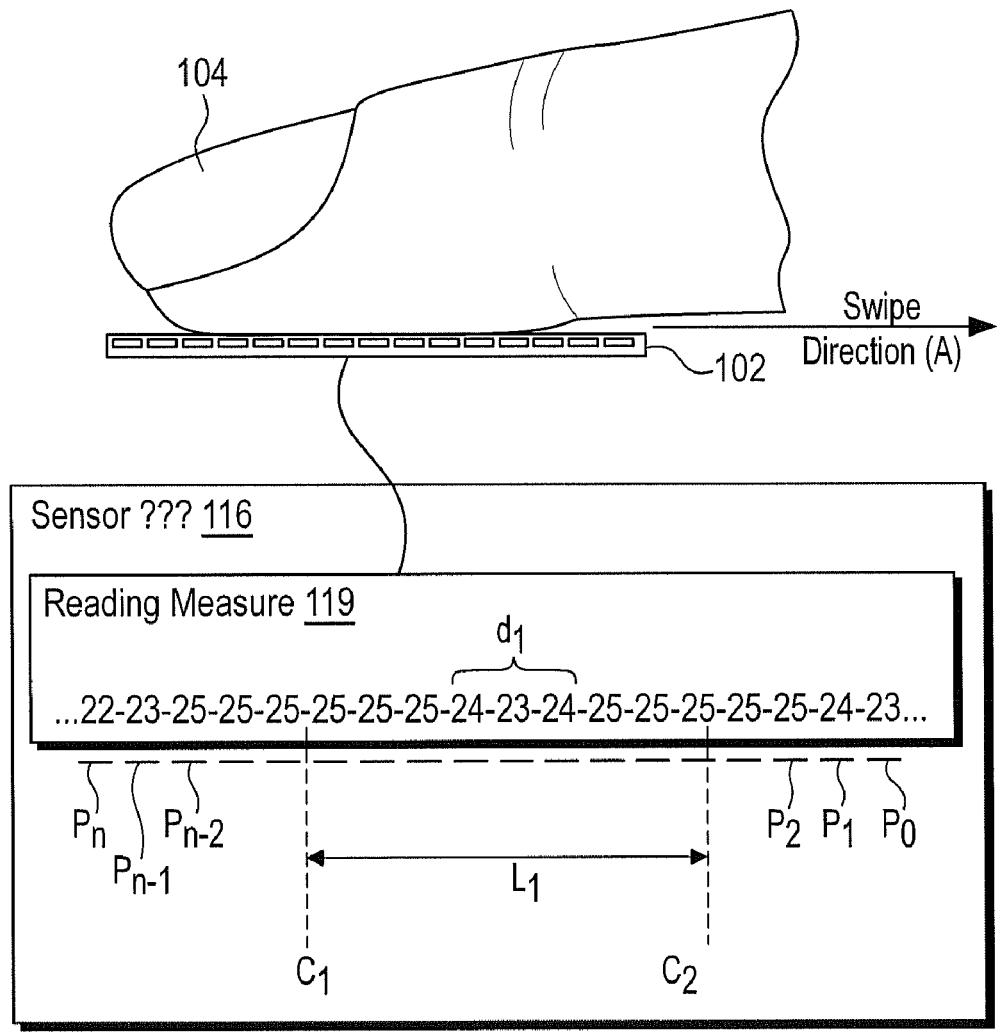
FIG. 1D shows the motion of a finger over the finger motion sensor array.

Usually, a sensor array will contain a large number of individual plates, and these are shown in FIG. 1d. Here again, finger (104) is swiped across sensor array (102) in swipe direction (A), and the changes in the electrical characteristics of the plates at various times are detected by sensor circuit (116). Usually the sensor circuit (116) will rapidly scan across the various plates Pn to P0, and report a series of electrical values from each plate for each scan and, relevant to this discussion, for each scan time. The result from one of these scans is shown as the reading measure (119).

Referring back to FIG. 1B for a moment, note that as the edge of the finger (107) passess over plate $P_n$, there is a region of partial finger contact. That is, while the finger is completely over plate $P_{n-2}$, the finger edge (107) is only partially over plate $P_n$. This region of partial contact can be detected by the electrical measurements of the plate, and the relative degree of finger edge contact (107) influences the electrical signal returned by plate $P_n$.

As a finger tip (107) passes over a particular plate, the plate generates varying electrical signals. In particular, when the finger tip (107) first contacts either edge of the plate, for a while an intermittent (noisy) electrical signal is generated. Then, when the edge of the finger migrates away from the edge more towards the middle of the plate, there is a region where the electrical signal is more stable. Finally, when the edge of the finger migrates toward the opposite edge of the plate, there is another region where again a noisy electrical signal is generated. Thus the timing of the regions of noise and stability contains useful information relative to the precise location and speed of the bulk of the finger, which the present invention exploits to improve the robustness and accuracy of the fingerprint scanner.

Thus, according to the invention, the sensor circuit is able to determine a stable period where it is determined that the fingerprint surface is present and being sensed by a particular sensing element and the readings are continuous. The processor (116) and motion process software (116d) can use this information, in conjunction with preprogrammed knowledge of the geometry and dimensions of the various sensor plates (which can be stored in persistent memory (116b) or alternatively in RAM (116c)), to determine, with improved accuracy, exactly what portion of the finger surface containing fingerprint (106) are passing over a fingerprint imager (sensor) at any given instant of time. This improved finger location information allows the various partial fingerprint images, produced by the fingerprint imager (sensor), to be stitched together by software into a more accurate complete fingerprint image. The complete fingerprint image is more accurate because the relative location of the various partial fingerprint images is better defined. An additional advantage is that by this more detailed analysis of noise and stable periods, more marginal finger swipes can be "saved", and users will be able to use the system with less training, or alternatively will not need to repeat finger swipes so often. The end result is improved user satisfaction and higher commercial success.

Figure 1E:
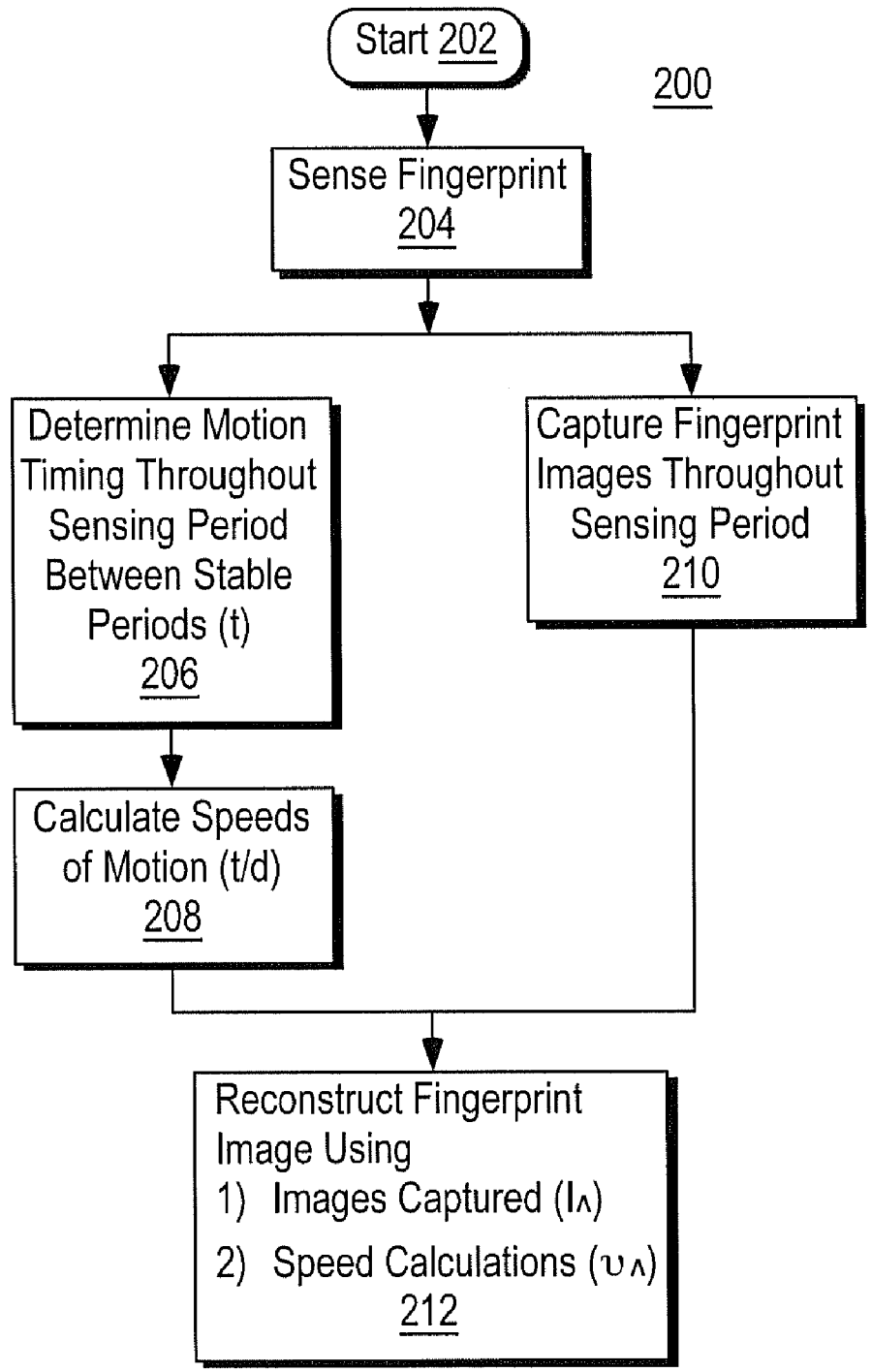
FIG. 1E shows a flow chart of the algorithm used to determine finger motion.

In order to do this, the motion process software (116d) will perform algorithms or processes similar to that shown in FIG. 1E. The process starts in Step (202). In Step (204) the fingerprint is sensed by the system. From here, there are two separate sub processes that occur nearly simultaneously. In Step (206), the system determines motion timing throughout the sensing period between stable periods of the sensor signal. This process simply calculates the speed and location of the bulk of the finger as it is being swiped across the sensor. In Step (208), the speeds of bulk finger motion are calculated (and also bulk finger location), based upon the system's knowledge of the dimensions and locations of the various sensing plates.

In the parallel process (210), the fingerprint images are captured throughout the sensing period by the fingerprint sensor. In this separate process, which can be completed essentially simultaneously with the bulk finger speed and location sensing, the actual image of the fingerprint (formed from the underside of the bulk finger) that is being swiped across the sensor is being recorded.

It should be appreciated that the accuracy and success of this approach is dependent on the accuracy of the finger location and movement data. Earlier approaches, which neglected finger edge and noise considerations, were essentially blind to finger locations while the finger traversed a given sensor plate $P_n$. By contrast, by making use of the fact that the plate signal becomes nosier as the finger approaches plate edges, and becomes more stable while the finger is near the center of the plate (process step (206)), additional information is available to help determine finger location and movement to higher precision.

Put another way, according to the invention, the process step (206) is an improved process step which more accurately calculates the bulk finger motion and relative location as it moves from one sensor plate (element) to another during a finger swipe. This data, in combination with speed and location calculations (208) determines the location of the fingerprint images (210) on the finger surface more precisely. In Step (212), the fingerprint image is reconstructed using the images captured in Step (210), and also the speed calculations calculated in Step (208). Using this information, the fingerprint image can be reconstructed more accurately. Usually this reconstructed fingerprint will then be compared to an authorized fingerprint in order to give security authorization for the user.

Figure 1F:
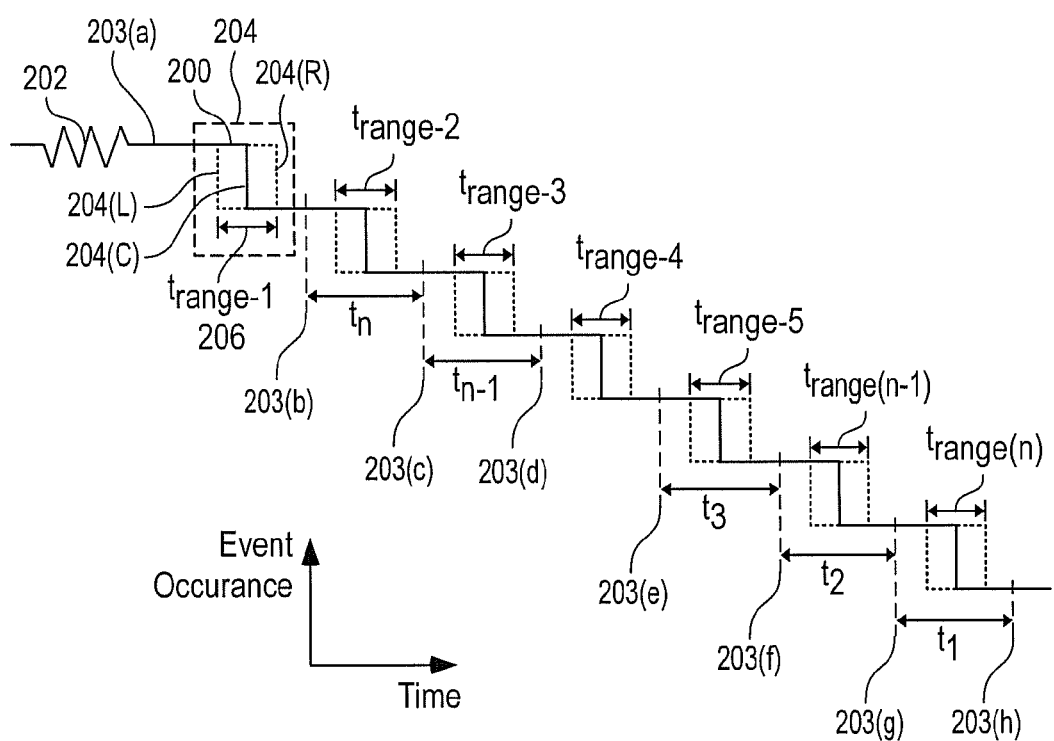
FIG. 1F shows a detail of the timing of the signals that are produced by the finger motion sensor array.

FIG. 1F shows a simplified view of the sensor data that is obtained from the finger position sensor array during a swipe. The Signal (200) is an idealized example of a signal that would typically be produced by the sensor elements as during a swipe. The fingerprint signal begins in Step (202) when a fingerprint first is set upon the fingerprint sensor. Typically, a noisy signal (202) initially occurs because the location of the fingerprint with respect to the separate elements of the fingerprint sensor is initially only partially defined as the finger settles onto the sensor plates. As the finger moves from one plate to the next, the overall signal changes, and this is represented by the stair step pattern in FIG. 1F.

Once the finger has settled on to the sensor, the signal will then enter a region of relative stability (203A). However this stability then becomes interrupted as the finger then begins to move across the various sensor plates during the progress of the swipe. During the swipe, as the finger tip (107) transitions from between one plate gap and the other, the signal changes as a series of somewhat noisy steps.

The transition stage as the finger tip moves off of a first sensing plate (usually the plate furthest away from the fingerprint imaging sensor) is shown in the area circled by region (204). As the finger moves, the originally steady signal once again becomes unstable and unsure (to keep the diagram simple, this signal noise is not shown). During transition region (204) noise in the signal makes it difficult to precisely determine if the finger is on or off that particular plate, and approaches, which attempt to simplify the signal into a binary "on plate" or "off plate" result are thus prone to error. In reality, the signal transition region where the finger tip transitions from one plate to another may be relatively broad, beginning on the left side of the region (204L) and ranging to (204R), with a center point (204C).

One possible way to cope with the problem is to look at the time interval where the noise begins (passes a certain threshold), look at the time interval where it ends (again passes a certain threshold), and use the midway point to localize the exact time when the tip of the finger passed a given plate gap. Although this works, the results are still prone to error because the beginning time and ending time of a noisy signal can be rather indefinite. Sometimes random noise will cause the beginning tune of the noisy signal to be immediately detected, and sometimes, due to random fluctuations, the beginning time of the noisy signal will not be immediately detected. Similarly sometimes random noise will cause the end time of the noisy signal to be immediately detected, and sometimes the end time of the noise signal will not be immediately detected. Thus the "midway noise time" approach to precisely locate finger location and velocity does not produce timing results with optimal accuracy, and can produce many small timing errors. These timing errors in turn translate into bulk finger velocity and location data with suboptimal accuracy. This in turn leads to suboptimal accuracy in assembling a complete fingerprint scan from a mosaic of partial fingerprint images.

In a more favored embodiment of the invention, the transition is not determined by the center of the noise field (204C). Rather it is determined by the center point of the stable (noise free) region (203(b)) and the center point of a subsequent stable (noise free) region (203(c)).

Returning to FIG. 1B for a moment, on a physical level, this change in algorithm is somewhat like trying to define when the fingertip (107) is midway over a plate, rather than trying to determine when the fingertip (107) is midway over a gap (103). Whereas small fluctuations in finger position will have a big impact on the finger tips being over or not over a gap (103), and thus have a big impact on the noise produced by sensing plates $P_n$ and $P_{n-2}$, small fluctuations in finger position when it is midway over a plate (in FIG. 1B, finger tip (107) is midway over plate $P_n$) will have a relatively small impact on the signal produced by plate $P_n$. Thus looking at the position when the fingertip is midway over a plate, rather than looking at the position when the fingertip is midway over a gap (103), is less sensitive to random fluctuations, and can produce results with higher accuracy.

Returning to FIG. 1F, the center point of the stable (noise free) regions is shown in (203(a)-(h)). As previously discussed, use of these noise free regions is favored because it produces more accurate results. First looking at the timing $t_{range-1}$, it is easier for a system to calculate the beginning and the end of that range. Once the center point is known, the center point to subsequent center point times can be used to determine the location of the finger as it moves across the sensor during a particular period of time. Thus, using the timing one center point of a stable region, such as (203b) to the center point of a subsequent stable region (203c), a more accurate timing $t_n$ can be calculated from one point to the next. Using this process, the different times that the bulk of the finger passes different sensor plates can be determined as timing intervals $t_n, t_{n-1}, t_{n-2} \ldots t_3, t_2, t_1$ and $t_0$.

Figure 1G:
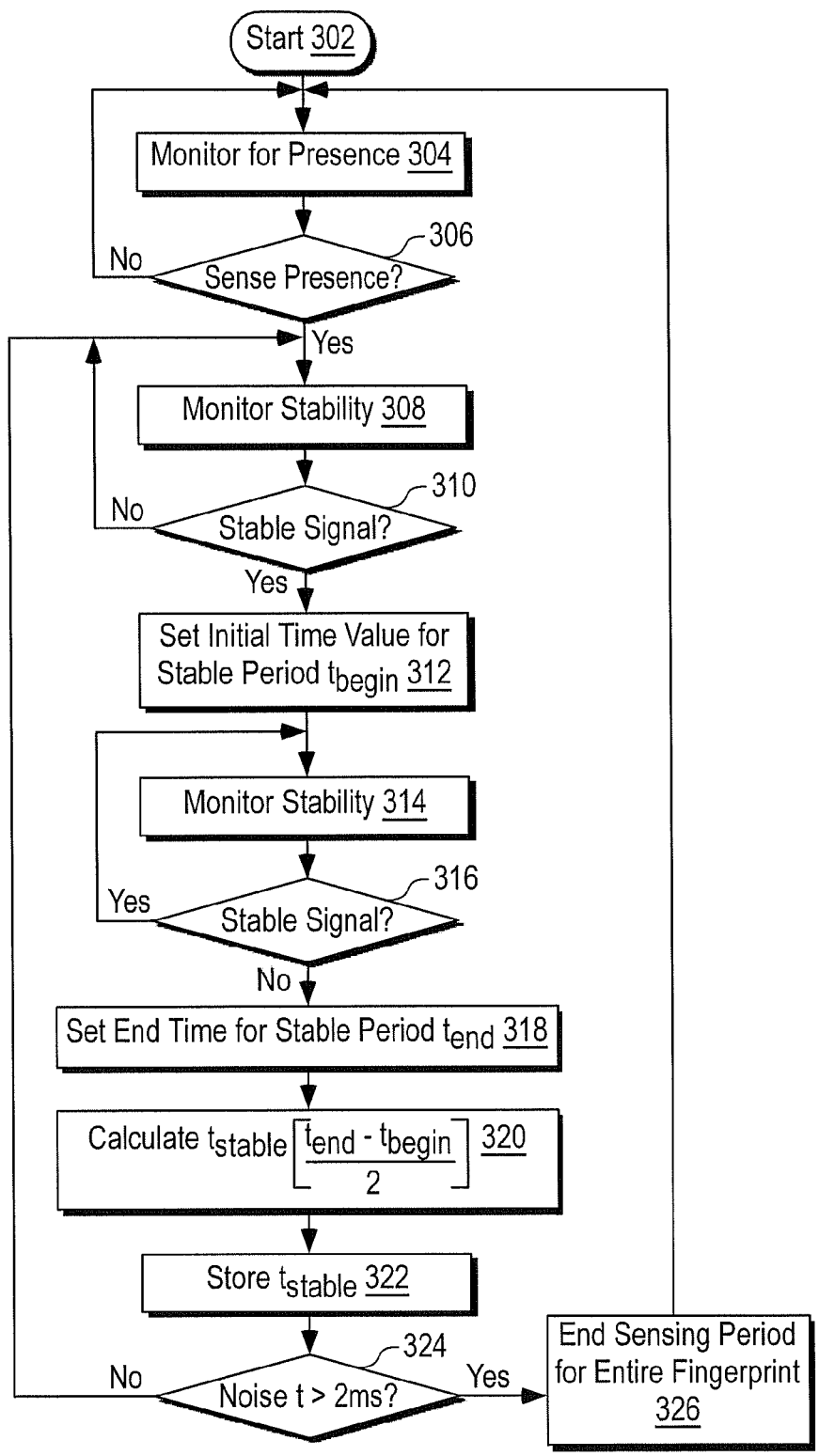
FIG. 1G shows a flow chart of the improved algorithm used to determine finger motion.

Processor (116a) and motion process software (116d) can use this information to deduce finger location and speed. A flow chart for doing this is shown in FIG. 1G. The process starts in Step (302). In Step (304), the fingerprint sensor (or the finger position sensing array) is monitored for the presence of a finger being swiped across it. In Step (306), it is determined whether or not the presence of a finger has been detected. If not, the process returns to Step (304) where monitoring for presence continues. Here for example, if there is an absence of signal from the sensor, the circuit is assumed to be dormant or inoperable.

After the finger presence is sensed, then the system is initiated and the sensing of a finger location and fingerprint scan commences. In Step (308), a sensor circuit connected to the finger position sensing array (see FIG. 1, sensor circuit (116)) is configured to monitor the signal for time periods of stability between noise, as previously described in FIG. 1F. As previously discussed, when the finger is first applied to the sensing array, the signal will initially suffer from noise. Thus the system next monitors this initial noise to dissipate before initiating the speed sensing. The signal stability is monitored in step (308), and enters a hold loop until a stable signal is detected (310). Once the signal is stable, the process goes from Step (310) to (312) and sets an initial timing value for the stable period, $t_{begin}$. The process then enters another loop where it continues to monitor stability of this signal in Step (314). (As can be seen in FIG. 1F, this corresponds to first waiting out unstable period (202), and looking for the start of the stable region (203(b)).

Once the signal looses stability, this is detected in Step (316), and the ending time $t_{end}$ of that formerly stable period is assigned in Step (318). In Step (320), the stability time period is calculated by the following formula:

$$t_{stable}=(t_{end}-t_{begin})/2,$$

In Step (322), the value Of $t_{stable}$ is stored. In Step (324), it is determined whether or not the sensing processes are completed.

If the noisy signal lasts for less than a preset time, such as less than 2 milliseconds, the system may determine that the finger was very briefly swiped but now is no longer present on the sensor. In this case, the process may return to Step (308) and continue to monitor for a stable signal. If the process is completed, then the process proceeds to Step (326) where the end of the sensing period is determined and the entire fingerprint is presumed to swiped and sensed. The process then returns to Step (304) where the system continues to monitor for presence of another fingerprint. As a result of this process, the finger position sensing array, processor, and software thus act to collects the data previously discussed in FIG. 1F.

As previously discussed in FIG. 1E, while the finger location and motion data is being collected by the finger sensing array, a fingerprint imager or scanner will be collecting (210) a (usually large) number of images (usually 1 dimensional fingerprint scans) of various portions of the fingerprint that is located on the underside of the finger. In order to assemble a complete fingerprint, the location and speed data of the finger from which each partial fingerprint image was obtained (raw data previously processed in FIG. 1F) is used to essentially assemble a mosaic of partial fingerprint images, producing the full fingerprint. This process is shown in FIG. 1H.

Figure 1H:
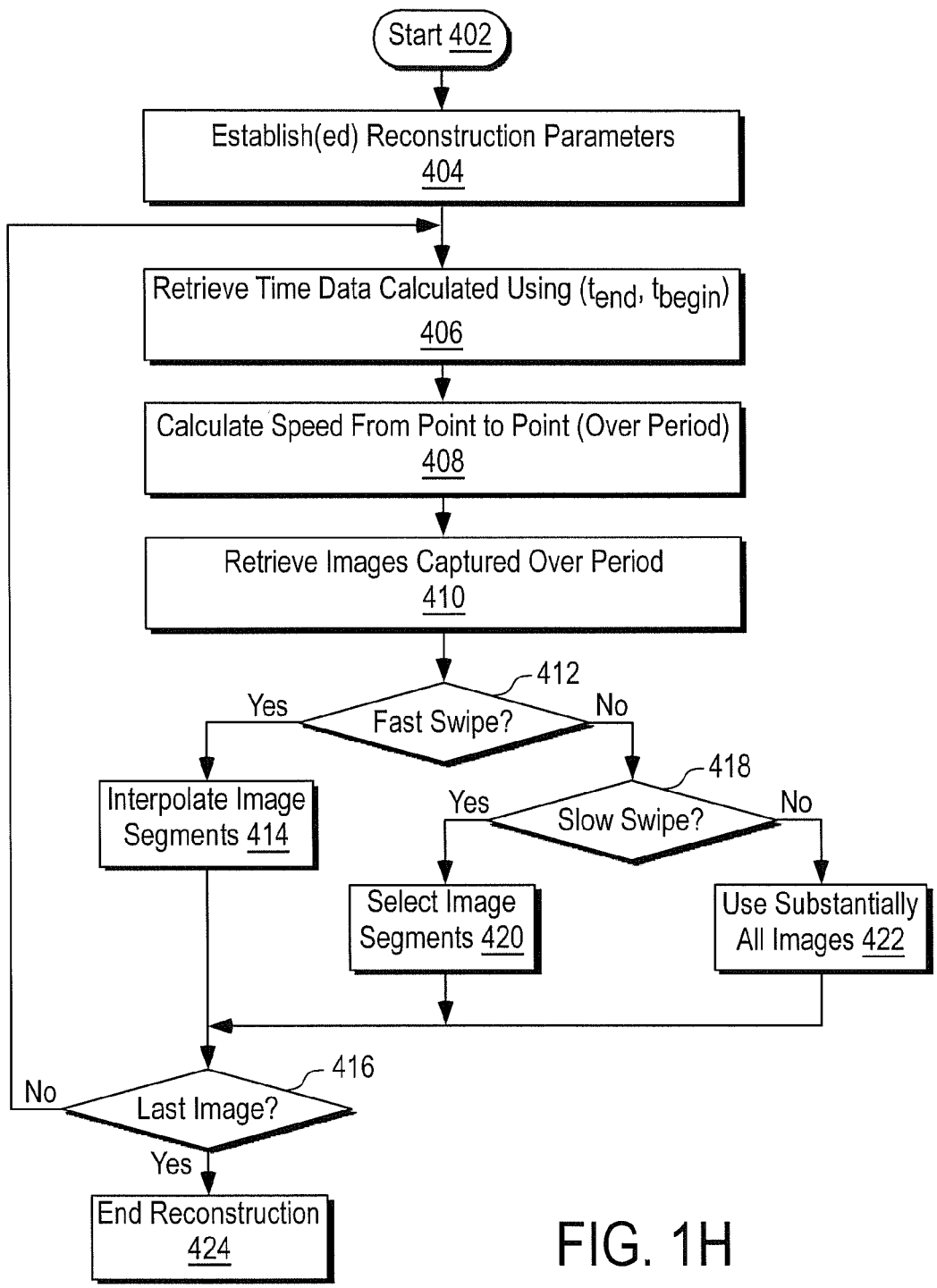
FIG. 1H shows how finger motion data may be combined with a series of partial fingerprint images, and used to in the process of reassembling the partial fingerprint images into a complete image of a fingerprint.

In FIG. 1H, a process for reconstructing a fingerprint using the values generated in the process from FIG. 1G is illustrated. First, the system may establish reconstruction parameters—usually the various coefficients and criteria used to create the final fingerprint mosaic. In Figure (406), the timing data calculated in the timing process discussed in FIG. 1G above is retrieved, retrieving $t_{end}$ and $t_{begin}$. Then, the speed is calculated from point to point over a period in Step (408). In Step (410), the partial fingerprint images are retrieved.

The fingerprint image reconstruction strategy will differ somewhat depending upon how fast the finger was swiped. Usually the partial fingerprint images will be collected at a set number of images per second, producing a defined number of different partial fingerprint images every second. If the finger was swiped slowly, then so much data and so many partial fingerprint images may have been collected as to create much redundancy, and many of these redundant partial fingerprint images can and should be discarded so as not to clutter system memory and processing resources with a lot of redundant data. On the other hand, if the finger swipe was fast, the reverse problem may have occurred, in which an insufficient number of partial fingerprint images may have been recorded. In this case, since fingerprints usually consist of a series of connected grooves, it is usually adequate to make up for at least a small amount of missing data by interpolating between neighboring images (image segments).

In Step (412), the finger speed data from the fingerprint sensing array is used to determine if the fingerprint motion was fast enough to be treated by the "fast swipe" algorithm. If the swipe was a fast swipe, then any gaps between the various partial fingerprint images (again usually one-dimensional fingerprint scans), here called "image segments" may be filled in by interpolation Step (414). If the swipe was a very slow swipe, then redundant (overlapping) partial fingerprint images may be discarded Step (420), and the selected partial fingerprint images (image segments) are used to reconstruct the entire fingerprint. If the swipe was neither too fast or too slow (422), then most of the images can be used. In either of three scenarios, the process ends up in Step (416) to determine whether or not the last image has been used in order to reconstruct the fingerprint image. If it is not the last image, then the process returns to Step (406) where the timing data is retrieved. Once the last image is captured, as determined in Step (416), then the reconstruction of the image is ended in Step (424).

Figure 1I:
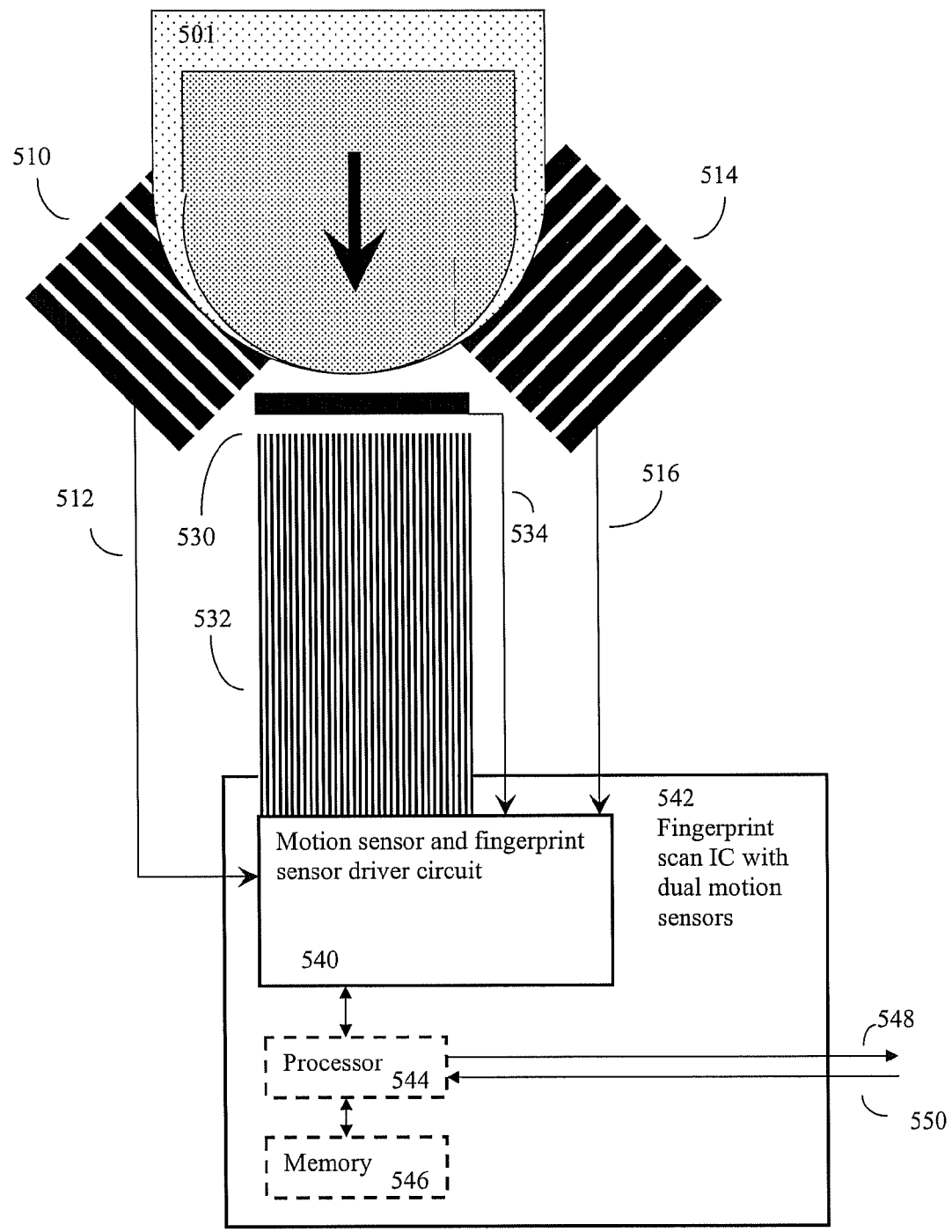
FIG. 1I shows a diagram of a deep finger penetrating radio frequency (RF) based partial fingerprint sensor equipped with two finger motion sensing arrays.

FIG. 1I shows a diagram of another embodiment of the present invention. In this embodiment, a deep finger penetrating radio frequency (RF) based partial fingerprint sensor (configured generally according to the teaching of U.S. Pat. No. 7,146,024, and US Publication Nos. US 2005-0244038 A1, US 2005-0244039 A1) is equipped with two finger motion detection sensor arrays (510), (514), each mounted at an angle to the other, and one partial fingerprint imager sensor (530). In this configuration, the motion of finger (501) is detected by both motion detection sensor arrays (510) and (514) and the underside of the finger passes over partial fingerprint scanner (530). These sensors can all be controlled by the same motion sensor and fingerprint sensor driver circuit (540) located on integrated circuit chip (542). Data from motion sensing array (510) passes to circuit (540) via circuit traces (512) (for simplicity, only one trace is shown but in actuality, multiple traces may be used). Data from motion sensing array (514) passes to circuit (540) via circuit traces (516) (again for simplicity, only one trace is shown but in actuality, multiple traces may be used). Partial fingerprint imager (530) has multiple excitation lines (532) which produce electrical signals that are influenced by the depth of fingerprint ridges, and these signals are picked up by electrode (534) and relayed back to circuit (540). Integrated circuit chip (542) may also have an optional microprocessor core (544) and optional onboard volatile or non-volatile memory (546). This processor (544) may implement one or more motion and image sensing algorithms, and in some embodiments may be considered to be processor (116a) FIG. 1A. Similarly memory (546) in some embodiments may be considered to be memory (116b) or (116c) or (116d) from FIG. 1A. The results of the scan are output via output line (548). Processor (544) may also be controlled by input (550) from circuits outside of chip (542).

In operation, the motion of finger (501) will generate differential motion signals on motion sensor arrays (510) and (514). In the configuration as shown, if the two arrays produce an identical motion signal, then the finger is proceeding directly towards the partial fingerprint scanner (530). If motion sensor (510) is producing more motion, then the finger is veering to the left. If motion sensor (514) is producing more motion, then the finger is veering to the right. In this way, the same device may produce both fingerprint scans, and may also produce two dimensional finger motion information that can be used in a "mouse like" manner to control a cursor or perform other control operations on an electronic device. Also in this configuration, sensing arrays (510), (514), (530) and traces (512), (516), (532), (534) may all be mounted on the same flexible film-like circuit, and IC chip (542) may be also mounted on this flexible film-like circuit a few centimeters away in a more remote location that is less prone to be subjected to environmental stress. In some embodiments, this configuration may resemble FIG. (2D) or (8A).

Some examples of how a collection of partial fingerprint images are reassembled to form complete fingerprint images are shown in FIGS. 1J to 1M.

Figure 1J:
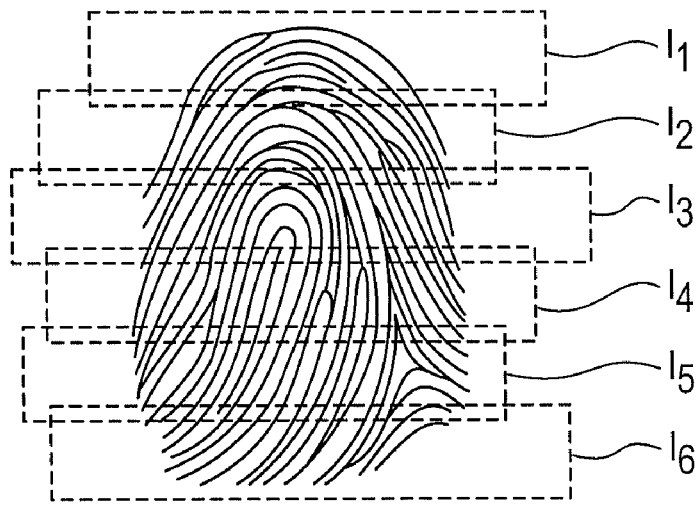
FIG. 1J shows how the finger position data may be used to help reconstruct a fingerprint image from overlapping partial fingerprint images.

In FIG. 1J, the various partial fingerprint images $I_1$, $I_2$, $I_3$, $I_4$, $I_5$ and $I_6$, (here termed "image blocks" or "segments") have partial overlap. These sections can be used to reconstruct the image, and the overlapping image data can be excluded. This type of situation is associated with slow fingerprint scans.

In order to determine which partial fingerprint images should be discarded or excluded, it will sometimes be useful to perform image analysis to confirm or detect image redundancy. Often, this can be done by simple algorithms, such as, on a per pixel basis, subtracting a first image from a second image, and then summing up, over the pixels in the image, the difference and determining if this difference is less than a preset threshold. If so, then the images are likely to be redundant. More sophisticated redundancy determination algorithms may also be used.

Figure 1K:
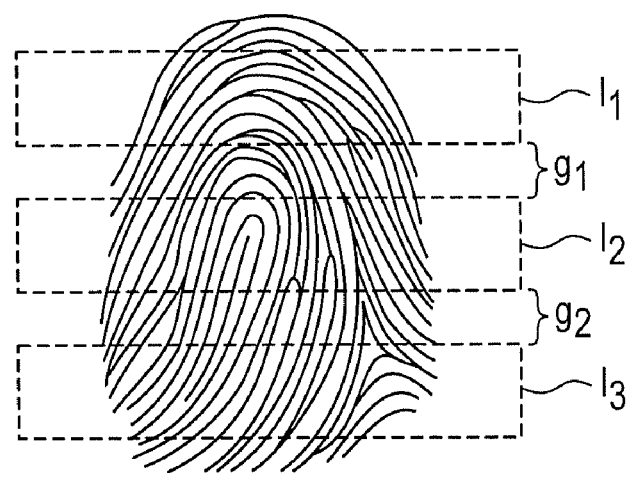
FIG. 1K shows how the finger position data may be used to help reconstruct a fingerprint image from non-overlapping partial fingerprint images that may contain one or more gaps between the partial images.

By contrast, in FIG. 1k, the problem of partial fingerprint image gaps caused by too rapid a swipe is illustrated. As can be seen, there are gaps $G_1$, $G_2$, that illustrate the gaps between the images captured, $I_1$, $I_2$, and $I_3$. In practice, these gaps would need to either be corrected by interpolation at to properly reconstruct the fingerprint image, and if the number of gaps exceeds some preset criteria, the data should be discarded as being invalid, and the user invited to repeat the fingerprint scan. Again, like FIG. 1j, these image sections, $I_1$, $I_2$, and $I_3$ are large in comparison to those in practice (the figure shows two dimensional images, whereas typically the partial fingerprint images are actually one dimensional scans), but are shown here for illustration.

Various types of interpolation may be used to correct for the missing data between images. The interpolation may be an adaptive algorithm that changes its parameters depending upon the image data, or a non-adaptive algorithm that treats all pixels in the image the same way. If a non adaptive algorithm is used, this algorithm may use a variety of different techniques including bicubic, bilinear, lanczos, nearest neighbor, sinc, spline or other methods. If an adaptive method is used, this method may use a variety of different techniques including Genuine Fractals, PhotoZoom Pro, and Qimage. Often, it will be convenient to use nearest neighbor interpolation methods or bicubic interpolation methods because such methods tend to require less microprocessor processing time. Anti-aliasing techniques to remove the jagged edges that separate the images on one side of a gap from the image on the other side of the gap may also be used.

Figure 1L:
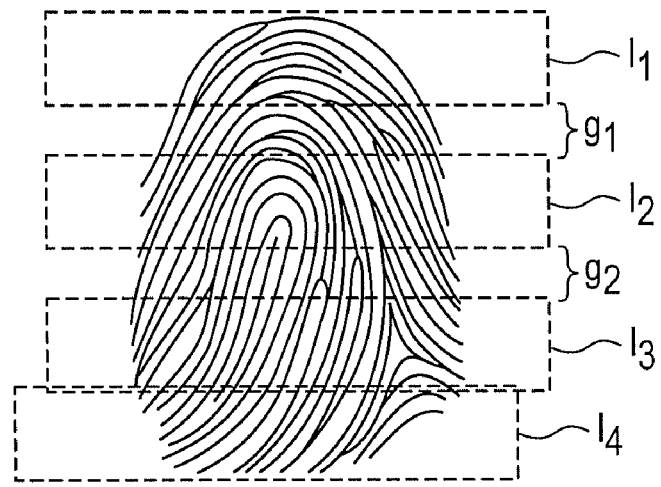
FIG. 1L shows how the finger position data may be used to help reconstruct a fingerprint image from mixed partial fingerprint images, some of which are overlapping, and some of which contain one or more gaps between the partial images.

The problem of an inconsistent fingerprint swipe, with mixed slow and fast regions, is shown in FIG. 1L. Here partial fingerprint images, for example, $I_1$ and $I_2$ are separated by gap $g_1$, indicative of a fast swipe over this portion of the fingerprint as it is swiped across the sensor. Also, image $I_2$ and $I_3$ also have gap $g_2$, showing that the swipe was fast here as well. However image sections $I_3$ and $I_4$ are overlapping, indicating that the finger slowed down to normal speed over this portion of the swipe. Here, the missing information in gap $g_1$ and $g_2$ can be compensated for by interpolation, but no such step is needed for images $I_3$ and $I_4$.

Figure 1M:
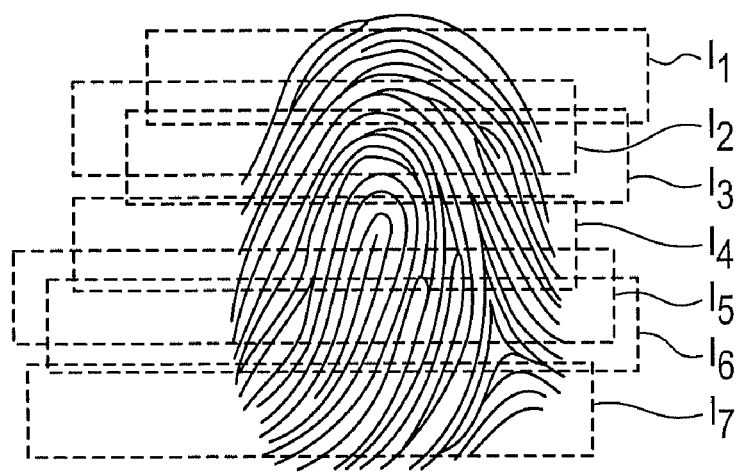
FIG. 1M shows how the finger position data may be used to help reconstruct a fingerprint image from partial fingerprint images that suffer from a high degree of redundancy and overlap between images.

The problem of a very slow fingerprint swipe is shown in FIG. 1M. Here many of the partial fingerprint images $I_1$ through $I_7$, are completely overlapping and redundant. For example, between image $I_1$ and $I_3$, these two images are slightly overlapping, yet capturing different portions of the fingerprint. They can both be used in reconstructing the fingerprint image. By contrast, image $I_2$ overlaps both image sections $I_1$ and $I_3$, making this image capture redundant. The system can thus omit this particular image in order to save processing time. Similarly, between images $I_4$ and $I_6$, image $I_5$ is completely overlapping with images $I_4$ and $I_6$, making the image $I_5$ also redundant. Thus image $I_5$ can also be omitted. This saves memory and processing time and power.

Alternate Embodiments

Alternate embodiments and sensor array configurations are also possible. In operation of another embodiment of the invention, the linear sensor array senses and captures fingerprint features in the form of a string of data signals by first sensing the features in an initial sensing and capture, and this is followed by one or more subsequent operations where a sample is taken of a subset of the fingerprint features are captured again over a known time period. This time period may be predetermined or measured as time progresses between sensing and capturing of the samples. Once at least two samples are taken, a subsequent sample is compared against a previous sample to determine the amount shift of the previous sample relative to the subsequent sample. In one embodiment, a single linear line of sensor pixels is used to sense a one-dimensional track of fingerprint features, and the signal sensed by the pixels is converted from an analog signal to a digital signal, where the features are then represented as a string of digital values. For example, the ridges of the fingerprint features may be represented as logical ones, and valleys represented as logical zeros.

When compared, the first string of digital values from one sample can be compared to the second string in a one to one relationship, and a similarity score can be produced that measures the number of matching values. If there is an immediate match, where both strings are substantially identical, then this would indicate that there was no movement during the time between which the two samples were taken. If there is not an immediate match, then this would indicate that there was some movement, and additional comparisons may be needed to determine the distance traveled. For each comparison, the strings of digital values can be shifted one or more pixels at a time. Once a good match is found, the distance traveled by the fingerprint is simply the number of pixels shifted times the distance between the pixels, which may be measured from the center point of one pixel to the center point of another pixel in the array of pixel sensors for example.

In one embodiment, a predetermined number of comparisons can be made along with corresponding similarity scores. The process may then choose the highest score to determine the most accurate comparison. The number of pixels that were shifted to get the best comparison can then be used to determine the distance traveled, since the size of and distance between the pixels can be predetermined, and the number of pixels can thus be used to measure the distance traveled by the fingerprint across the motion sensor over the time period of the motion.

In another embodiment, the process could make comparisons and generate scores to measure against a predetermined threshold, rather than making a predetermined number of comparisons. In this embodiment, the similarity score from each comparison can be measured after the comparison is made. If the score is within the threshold, then it can be used to indicate the amount of shift from one sample to another. This can then be used to determine the distance traveled by the fingerprint across the linear motion sensor.

In one embodiment, generally, the invention provides a fingerprint motion tracking system and method, where a single linear sensor array is configured to sense features of a fingerprint along an axis of finger motion. The linear sensor array includes a plurality of substantially contiguous sensing elements or pixels configured to capture a segment of image data that represents a series of fingerprint features passing over a sensor surface. A buffer is configured to receive and store image data from the linear sensor array. And, a processing element is configured to generate fingerprint motion data. The linear sensor array may be configured to repeatedly sense at least two substantially contiguous segments of fingerprint data, and the processor can generate motion data based on at least two sensed contiguous segments of fingerprint data. In operation, the linear sensor array is configured to sense a first set of features of a fingerprint along an axis of finger motion and to generate a first set of image data captured by a plurality of substantially contiguous pixels of the sensor array. The linear sensor array is also configured to subsequently sense a second set of features of the fingerprint along an axis of finger motion and to generate a second set of image data captured by a plurality of substantially contiguous pixels of the sensor array. The processing element can then compare first and second sets of image data to determine the distance traveled by the fingerprint over a time interval.

As used herein, linear sensor array is a generic term that relates to a portion of sensing elements, whether they are pixels in an optical reader, a static or radio frequency reader that reads electric field intensity to capture a fingerprint image, piezoelectric components in touch-sensitive circuit fingerprint readers, or other elements indicative of fingerprint readers, where the elements are used to sense a portion of the fingerprint, rather than the entire fingerprint. Such sensor arrays may be configured in a number of ways within a matrix of well known sensor devices. For example, as previously discussed, several modern configurations are described and illustrated in pending U.S. Publication No. US 2006-0083411 A1 entitled: Fingerprint Sensing Assemblies and Methods of Making; U.S. Publication US 2005-0244039 A1 entitled: Methods and Apparatus for Acquiring a Swiped Fingerprint Image; U.S. Publication US 2005-0244038 A1, entitled: Fingerprint Sensing Methods and Apparatus; U.S. Publication US 2003-0035570 A1 entitled: Swiped aperture capacitive fingerprint sensing systems and methods, and other applications that are all assigned to common assignee Validity, Inc. Also, many other types of sensor matrices exist in the art directed to capturing fingerprint images. The invention is directed to a novel system, device and method that are not limited in application to any particular sensor matrix or array configuration. In fact, the invention can be used in conjunction with or incorporated into such configurations to improve performance, and further to reduce the processing resources required to capture and reconstruct images.

According to the invention, the linear sensor is substantially contiguous, which is to say that the sensor elements are in a relative proximity to each other so that a first reading of a portion of fingerprint features can be taken, followed by a second reading after a short period of time from another position. The two samples can be compared to determine the relative distance traveled by the fingerprint surface in relation to the sensor surface. The linear sensor is configured to merely take a relatively small sample of the fingerprint at one point in time, then another at a subsequent time. These two samples are used to determine movement of the fingerprint. Two or more samples maybe compared in order to compute direction and velocity of a fingerprint surface relative to the linear sensing elements. These samples may be linear, as described below and illustrated in the drawings, so that a linear array of fingerprint features can be recorded and easily compared to provide a basis for motion, distance traveled over time. If more than one sensor is employed, it is possible to determine direction of motion using vector addition with the different linear samples taken. Thus, some of the functions provided by the invention are a result of taking a linear sample to give a basis for vector analysis. However, those skilled in the art will understand that, given the description below and the related drawings, other embodiments are possible using other configurations of motion sensors, which would not depart from the spirit and scope of the invention, which is defined by the appended claims and their equivalents, as well as any claims and amendments presented in the future and their equivalents.

One useful feature of the invention is that ambiguity in results is substantially prevented. If properly configured, a system configured according to the invention can consistently produce a result, where at least two samples can be taken such that the features of one sample overlap with another sample. Then, comparisons can be made to determine the amount of shift, indicating the amount of movement of the fingerprint across the linear sensor. In prior art systems and methods, it is often the case that no result occurs, and a singularity results. Thus, a user would need to rep eat sensing the fingerprint. In some systems, substantial predictor algorithms have been created in an attempt to compensate or resolve the singularity when it occurs. Such applications are very large and demand a good deal of computation and processing resources, which would greatly bog down a portable device. According to the invention, sensing motion of a fingerprint is substantially certain, where samples taken from the fingerprint surface are consistently reliable. This is particularly important in navigation applications, where relative movement of the finger translates to movement of an object such as a cursor on a graphical user interface (GUI), discussed further below.

In one embodiment, the linear sensor array may be used alone to determine linear movement of a fingerprint. In another embodiment, the single sensor array may be used in conjunction with one or more other linear sensor arrays to determine movement in two dimensions. In either embodiment, the linear sensor arrays are utilized solely for determining motion. If the motion of the analyzed fingerprint occurs generally along a predetermined axis of motion, the single linear sensor array can be utilized to sense the velocity of the fingerprint being analyzed. To capture and record the motion of a fingerprint that is not directed along a predetermined axis of motion, two or more linear arrays (a plurality of arrays) can be used together to sense and record such motion, and a processor can determine the direction and speed of the fingerprint using vector arithmetic.

In yet another embodiment, one or more such linear arrays may be used in conjunction with a fingerprint sensor matrix to more accurately capture and reconstruct a fingerprint image. The sensor matrix can be configured to sense and capture an image of a portion of a fingerprint being analyzed, and the one or more linear arrays can provide motion information for use in reconstructing a fingerprint image. A device so configured would be able to more accurately sense, capture, record and reconstruct a fingerprint image using less processing resources than conventional devices and methods.

Alternatively, in yet another embodiment, one or more arrays can be used to generate motion information for use in accurate navigational operations, such as for use in navigating a cursor on a graphical user interface (GUI). Utilizing the improved processing functions of the invention, an improved navigation device can be constructed that is compatible with a portable device that has the power and processing restrictions discussed above. Examples of such embodiments are described and illustrated below.

A motion sensor configured according to the invention uses substantially less space and power compared to conventional configurations for motion sensing, navigation and fingerprint image reconstruction. Such a configuration can further provide aid to conventional fingerprint reconstructing processes by better sensing motion of a finger while it is being analyzed by a sensing device. This allows a fingerprint sensing device the ability to reconstruct a fingerprint analyzed by a fingerprint sensor with reduced power. Utilizing the invention, conventional processes that need to match and construct fragmented images of a fingerprint, particularly devices that sense and process a fingerprint in portions, can be optimized with information related to fingerprint motion that occurs while a fingerprint surface is being read. Also, using this unique motion detection technology, optimal navigation functions can be provided that demands significantly less power than conventional devices. Such navigation functions can enable a low power navigation device to be integrated in a portable device system, such as a mouse pad used to move a cursor across a graphical user interface (GUI) on portable electronic devices including cellular phones, laptop computers, personal data assistants (PDAs), and other devices where low power navigation functions are desired. A novel system and method are provided that uses minimal space and processing resources in providing accurate motion detection from which fingerprint sensors as well as navigation systems can greatly benefit.

A device or system configured according to the invention can be implemented as a stand alone navigation device, or a device to provide image reconstruction information for use with a line imaging device that matches and assembles a fingerprint image. Such a line imaging device may be any imaging device configured to sense and capture portions of a fingerprint, whether it captures individual perpendicular image lines of a fingerprint, or multiple perpendicular lines. In operation, a motion detection device can operate as a separate motion detection and/or direction detection device. Alternatively, a motion detection device can be used in conjunction with a line imaging device to more accurately and efficiently sense, capture, store and reconstruct a fingerprint image. A device configured according to the invention may include a single array of finger ridge sensing pixels or data sensor points centrally located along the principal axis of motion to be detected, a sampling system to periodically sample the finger contact across the array, and a computational module or element that compares two sets of samples collected at different times to determine the distance traveled while between the two sample times. According to the invention, the motion sensor pixels do not necessarily need to have the same resolution as the line imager. The motion sensor pixels may in fact use a different sensing technique than the imager.

Again, the invention provides separate operations for detecting motion and for sensing and capturing a fingerprint image. Thus, the techniques used for the separate processes can be the same or may be different depending on the application. Those skilled in the art will understand that different variations of the separate processes are possible using known techniques and techniques can be derived without any undue experimentation. Such variations would not depart from the spirit and scope of the invention.

Devices and Applications for Improved Navigation and Control:

The same techniques used to derive finger location and speed to help assist in assembling complete fingerprint images from partial fingerprint image scans can also be used for other purposes as well. In another embodiment of the present invention, these techniques can be used to create elegant "finger mouse" devices that allow the motion of a user's finger to control a computerized system in a manner similar to that of a conventional computer "mouse".

In this type of embodiment, the invention provides the capability of dual axis finger motion sensing through additional finger motion sensing arrays. In this embodiment, there are two or more (a plurality of) sensor arrays for detecting motion, and each axis is independently measured to determine the component of velocity in that axis. The velocity components from the individual axes are used to compute a vector sum to determine the actual direction and velocity of motion of the finger with respect to the sensor surface. According to the invention, it is not necessary to capture a full image of the fingerprint in order to determine the distance traveled and the velocity. It is only necessary to capture either the finger location, or enough of a linear sample of fingerprint features along the line of motion of the fingerprint to allow motion to be computed.

In one embodiment, a plurality of samples, such as two or three samples, are captured by motion sensor pixels and are used to determine the distance traveled across the axis of motion of the fingerprint relative to the sensor surface and the velocity at which the motion occurs. This information can also be used in "mouse like" computerized device navigational operations. If desired, the information can also of course, further be used in combination with a fingerprint imager to aid in reconstructing a fingerprint image.

In order to provide a navigation device, as well as to detect and correct for finger motion that is not completely aligned with the desired axis, either of the embodiments may be combined in ensembles such that one sensor is aligned on the axis of motion, and additional sensors aligned at an angle (such as 22.5 or 30 degrees) to the principal axis of finger motion. Examples of different embodiments are discussed below.

Figure 2A:
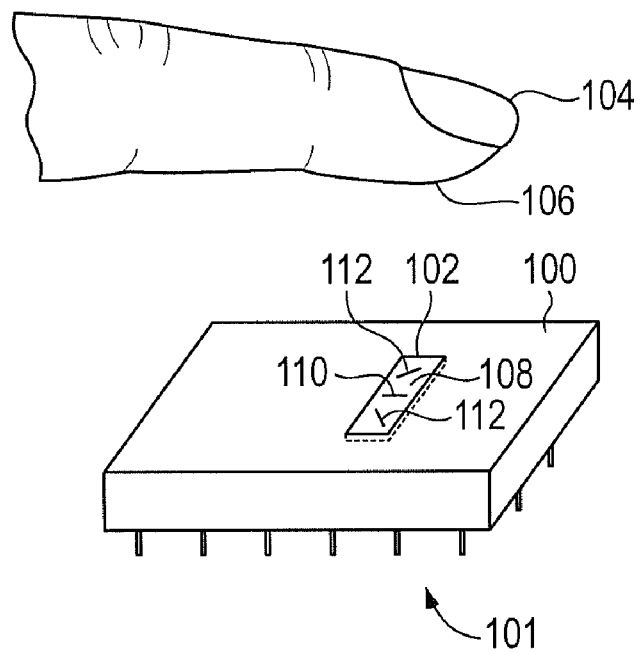
FIG. 2A shows a combination partial fingerprint scanner and finger motion detector device that has with multiple finger motion sensor arrays arranged at various angles.

Referring to FIG. 2A, a diagrammatic view of motion detection and tracking system configured according to the invention is illustrated. An integrated circuit package (100) or other unitized electrical component is illustrated having circuits and possibly software embedded (not shown) and electrical connections (101) for integration in and connection with a system that utilizes the circuit package. FIG. 2A illustrates an embodiment of the invention where a finger (104) can move its fingerprint surface (106) against sensor surface (108) to be read by the sensors (110), (112). These sensors can pick up movement information of a fingerprint for use in navigational applications, or can be used in conjunction with an integrated fingerprint sensor surface (108) to simultaneously capture and record portions of a fingerprint. Such a system configured according to the invention may be a stand alone component as shown, or can be integrated with other circuits for more space and power savings as well as efficiency. In a preferred embodiment, the sensor used to detect finger motion and the sensor used to image at least part of the fingerprint are present on the same unitized electrical component so that the two types of sensors are mounted or dismounted from an electrical appliance or device as a single unit. Those skilled in the art will understand that many variations of the configuration are possible, and that the invention is not limited to any particular configuration, but is defined by the claims and all equivalents.

The system further includes a sensor module (102) that is used to sense a user's finger (104) and fingerprint surface (106) when it is moved across fingerprint sensing surface (108). As can be seen, the fingerprint sensing surface (108) is illustrated as a narrow surface that is designed to sense and capture portions of a fingerprint as it is moves across the sensor. These portions can be subsequently reconstructed according to the invention using motion information from the motion sensors (110), (112). Thus, the sensor components illustrated in FIG. 2A have multiple utilities, and can be configured in devices that utilize part or all of such utilities, whether it is a stand alone motion sensor configured to sense movement and velocity in one direction, a multidirectional motion sensor configured to sense movement and velocity in several directions, or a combination device configured to sense motion either in one or more (one or more meaning a plurality of directions) directions and used in combination with a fingerprint sensor surface that reads portions of fingerprints and reassembles the fingerprints using the motion information from motion sensors.

Figure 2B:
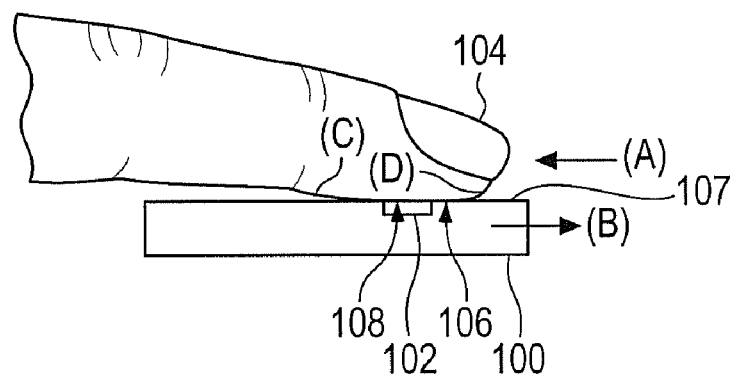
FIG. 2B shows the motion of a finger over the device shown in FIG. 2A.

Referring to FIG. 2B, a side view of the unitized sensor system of FIG. 2A is illustrated. In operation, the finger (104) is placed by a user onto the sensor surface (107), which includes fingerprint sensing surface (108), so that the fingerprint sensing surface (108) and the sensor surface (106) are juxtaposed relative to each other. The finger (104) may move in direction "A" and the sensor (100) may remain stationary. Alternatively the finger (104) and the sensor (100) may be moved in opposite directions A, B. Or the finger may be moved from side to side, or some combination of finger movements may be performed. In either case, device (100) will pick up the finger motions and translate these motions into electrical guiding impulses which may be used to control an electronic device. Thus device (100) can be considered to be a "finger mouse chip". This "finger mouse chip" may be placed on a wide variety of different electronic devices, and used to control a wide variety of functions, in the same way that a conventional mouse or joystick or mouse pad controls functions.

Figure 2C:
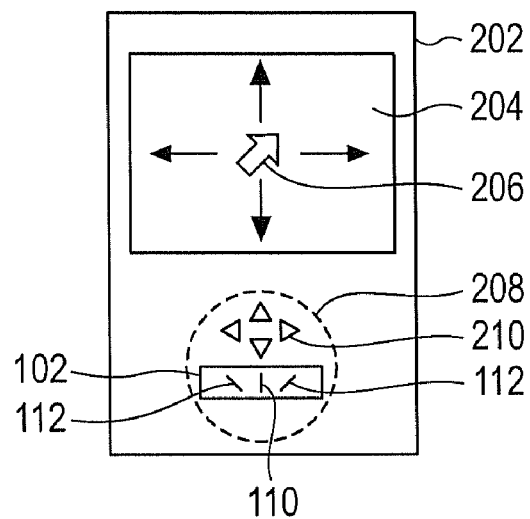
FIG. 2C shows the combination partial fingerprint scanner and finger motion detector device shown in 2A embedded as a component of a small portable electronic device containing a display screen. Here the motion of a finger over the detector device may control the movement of a cursor on the screen.

As an example, in FIG. 2C, chip (100) is embedded into a portable microprocessor controlled device (202). Device (202) could be a portable music player, a cellular phone, PDA or other device. In this example, device (202) has a graphical user interface (GUI) or screen (204), and a cursor (206) that may app ear on the screen. This cursor is capable of being moved across the screen under control of a user navigating a touch-sensitive cursor control (208), which in some embodiments is simply the "finger mouse chip" (100). The touch sensitive cursor has navigational indicia (210), which may be merely directional indicators located about sensor (102) that is located within or about that touch-sensitive cursor that acts as a navigational pad, similar to that of a mouse pad commonly used on laptop computers.

According to the invention, such a navigational pad can be greatly enhanced using sensor technology according to the invention, where directional movement sensors (110), (112) are used to guide the cursor (206) for searching for and selecting indicia such as toolbar items or icons for opening files, photos and other items when selected. In some applications, a multi-step sensor can read the fingerprint structures for guidance at one level, and may select indicia by pressing harder on the sensor for another level of sensing, Thus, a user can move the cursor around by lightly pressing on and moving a finger along the surface, then pressing harder when selecting an icon, toolbar or other indicia. Utilizing the invention, a more efficient navigation tool can be adapted to perform all of these tasks at low power and high accuracy, a very adaptable feature for portable devices.

Figure 2D:
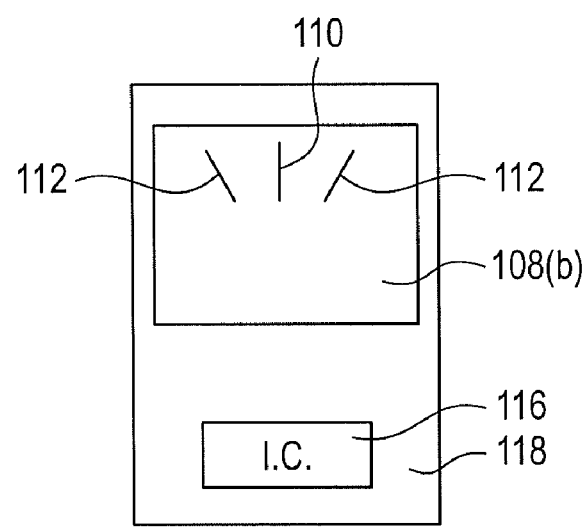
FIG. 2D shows that integrated circuit chip used to drive the finger motion detector arrays may be mounted on a flexible circuit or film some distance away from the actual finger motion detector arrays.

Referring to FIG. 2D, another embodiment of the invention is illustrated where the integrated circuit (IC) chip 116 is separate from the sensor surface 108(b). This configuration is particularly feasible for the finger position sensors of the present invention which are based on deep finger penetrating radio frequency (RF) technology. (See U.S. Pat. Nos. 7,099, 496; 7,146,024; and U.S. patent application Ser. Nos. 11/107, 682; 11/112,338; 11,243,100; and 11/184,464, the contents of which are incorporated herein by reference). In particular, see the flexible circuits of application Ser. No. 11/243,100, (for example FIG. 3), the contents of which are incorporated herein by reference. See also present FIG. 1I.

In this case, as previously discussed for FIG. 1I, the basic chip sensor circuit (see FIG. 1A (116)) may be mounted on a flexible thin support or film, and electrical lines may then extend out form the chip to form the various electrical sensing arrays. Usually electrical traces (or alternatively fiber optics) will at least partially connect the actual sensing arrays (110), (112) with the IC chip (116). However if deep finger penetrating radio frequency (RF) technology or optical sensing techniques are used, these traces need not be completely continuous. For simplicity, these traces are not shown.

Referring again to FIG. 2A, the surface (108) has embedded finger motion sensors (112) that, according to the invention, operate to detect the presence and motion of a fingerprint surface (106) about the sensor surface (108). These sensors can include a single motion sensor (110), aligned with a general finger motion direction for detecting distance traveled by the finger across the sensor over a period of time. This allows a processor to compute the velocity of the finger over the sensor surface. In another embodiment, there may be a single motion sensor (110) on the surface (108), or there may be a plurality, two or more motion sensors (110), (112), on the surface (108), depending on the application. The additional sensors (112) may be used to detect direction of a finger's motion across the sensor surface. In practical applications, a user may not move the finger exactly parallel with the sensor (110). A user may rub the finger surface (106) at an angle with respect to the axis of the sensor (110). A processor analyzing the velocity of the finger motion may then end up with an inaccurate velocity reading. This may be important when the data generated by the sensor is used for reconstructing a fingerprint, or when the sensor data is used for navigational purposes. According to this additional embodiment of the invention, the additional sensors (112) can be used to determine the direction of the finger surface when it is being analyzed. Using the data captured by the sensors, a processor can apply vector analysis to generate motion information. This motion information can be used in processes for reconstructing the fingerprint images, or alternatively for "mouse like" navigation processes.

Figure 2E:
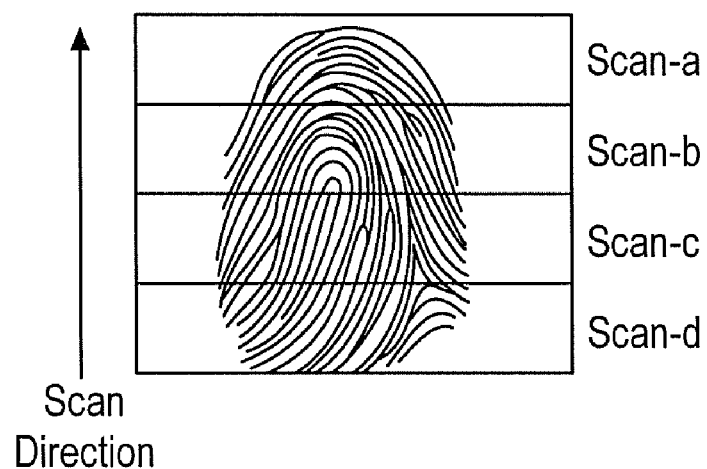
FIG. 2E shows an example of the advantages of capturing finger motion in two degrees fingerprint detectors. Here a complete fingerprint is recreated by assembling partial fingerprint images obtained by moving the finger in a vertical direction.
Figure 2F:
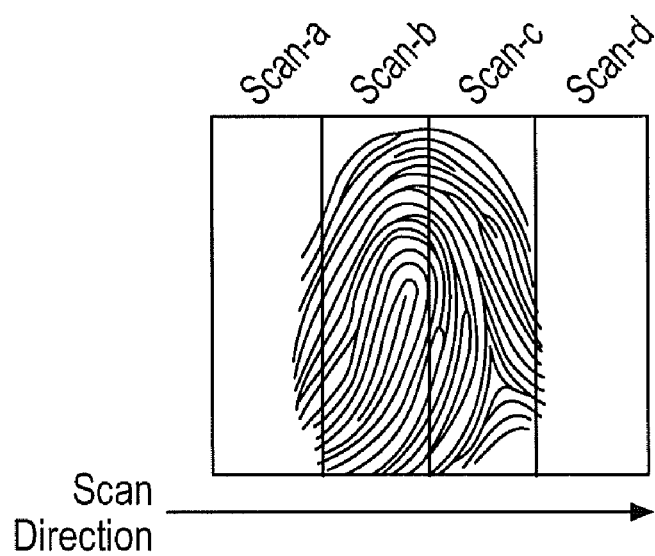
FIG. 2F shows an example of the advantages of capturing finger motion in two degrees fingerprint detectors. Here a complete fingerprint is recreated by assembling partial fingerprint images obtained by moving the finger in a horizontal direction.

One advantage of having motion sensors and possibly fingerprint imagers arranged to accept fingers moving with two dimensions of freedom (that is, combinations of up and down and right and left), is that fingerprints can now be created from very different types of finger swipes. As shown in FIG. 2E, a fingerprint image may be created from a series of partial fingerprint images created with a finger swipe going in the vertical direction. By contrast, FIG. 2F shows that a fingerprint image may be created from a series of partial fingerprint images with a finger swipe going in the horizontal direction. By combining finger motion sensors and partial fingerprint scanners aligned in more than one direction on the same device, users may use the device accurately under a much broader range of operating conditions, and thus may view such devices has having greatly superior performance and usability.

FIGS. 3-7 discussed below have a similar numbering pattern where the sensor surface (107) includes the two other sensing surfaces: an optional fingerprint sensing surface (108) and finger motion sensors (110) and (112). The different finger motion sensing devices, whether included with an image sensor for sensing a partial fingerprint image for future full fingerprint reconstruction, can be utilized for navigational operations, either with the partial fingerprint imager, or on a stand alone basis where the partial fingerprint imager is either turned off or is absent. In a preferred embodiment, the various finger motion sensors and the various partial fingerprint image sensors are present on the same unitized device, where by the two types of sensors can be simultaneously used as a single component of a larger electrical appliance. These different embodiments are described below in relation to sensing, capturing and reconstructing fingerprint images, but are also applicable in providing motion and direction information for use as navigational information, such as for use in navigating a cursor relative to the motion of a fingerprint over motion sensors.

Figure 3:
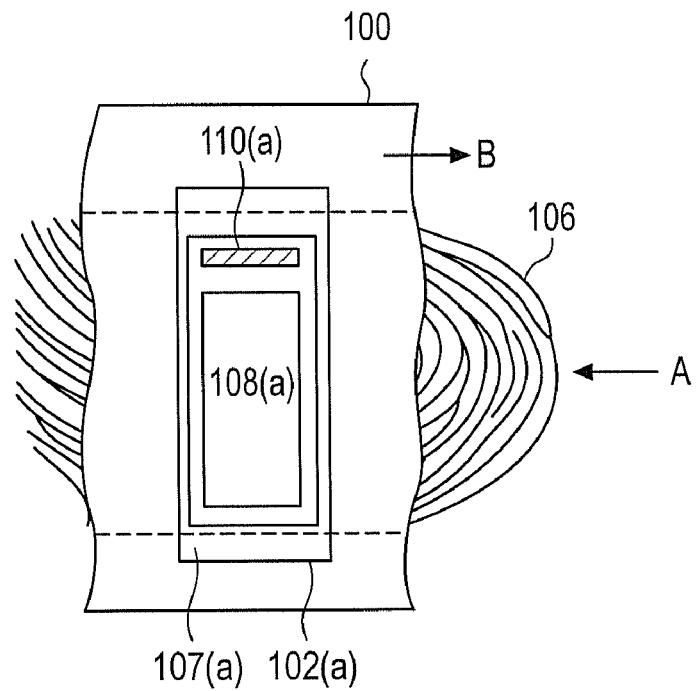
FIG. 3 shows a view of a finger moving over a combination finger motion sensor and partial fingerprint imager.

According to another embodiment 102(a) of the invention illustrated in FIG. 3, the sensor surface 108(a) may include image sensing elements used for broadly sensing and recording the fingerprint features. In addition, a motion sensor 110 (a) is included for sensing and recording the motion of the fingerprint. Such a device may be a single sensor embedded within the two dimensions of the sensor surface 107(a), with the fingerprint sensing surface 108(a) included for sensing and recording the full fingerprint. The motion sensors are configured to separately sense and recording motion information. Here, the sensor surface 107(a) includes a motion sensor 10(a) configured separately from fingerprint sensing surface 108(a). According to this embodiment, the motion sensor is separate from the fingerprint sensing surface, though located on the same sensor surface. In operation, a fingerprint surface 106 can be moved simultaneously along motion sensor 10(a) and fingerprint sensing surface 108(a). The motion information from the motion sensor, such as distance and time traveled over that distance, can be utilized together with the fingerprint sensing surface as an aid in reconstructing the separate portions of the fingerprint. As described further below, such a single motion sensor can also be used for navigation functions as well.

Figure 4:
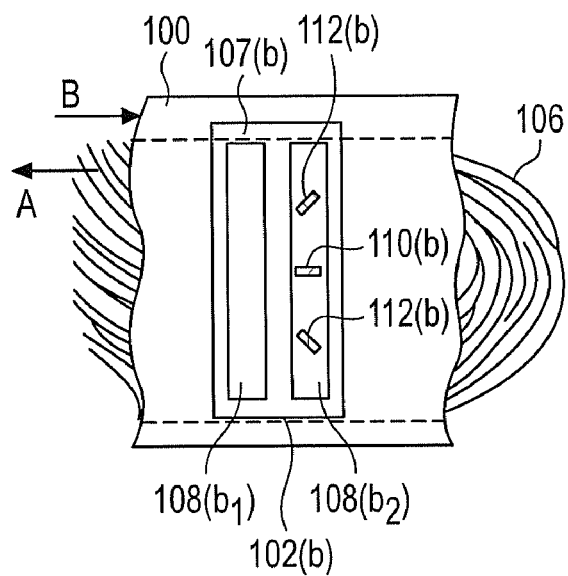
FIG. 4 shows a view of a finger moving over a combination finger motion sensor and partial fingerprint imager. Here the finger motion sensor is equipped to sense finger motion in two dimensions.

Referring to FIG. 4, another embodiment 102(b) of the invention is illustrated where motion sensors 10(b), 112(b) are located about fingerprint sensor surface 108(b) within sensor surface 107(b). The motion sensor 110(b) is located along an anticipated axis of motion of finger 106 with respect to device 100 in directions A, B. Motion sensor 110(b) can sense the distance and time expended over that distance to determine velocity, which can be used in reconstructing the fingerprint portions simultaneously captured by fingerprint sensor surface 108(b). Using the additional motion sensors 112(b), a fingerprint surface 106 can be sensed and captured even if a user slides the finger at an angle to the axis of the motion sensor 110(b). In fact, given the angles of the additional sensors 112(b) with respect to the central axis of the device, the direction of motion can be computed by a processor using vector addition. Thus, the direction, distance and time expended during fingerprint surface travel across the sensors can be used along with the fingerprint portions captured by the fingerprint sensor to accurately reconstruct the fingerprint image.

Figure 5A:
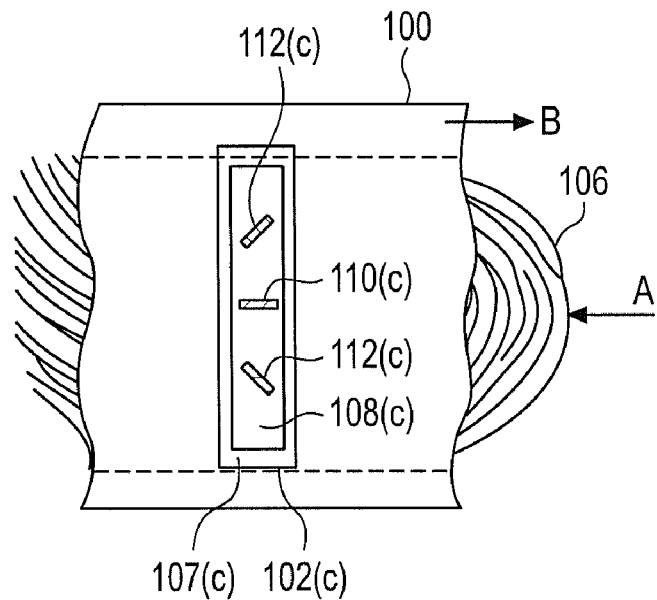
FIG. 5A shows a view of a finger moving over an alternate combination finger motion sensor and partial fingerprint imager. Here the finger motion sensor is equipped to sense finger motion in two dimensions.

Referring to FIG. 5A, yet another embodiment 102(C) of the invention is illustrated, where the finger motion sensors 110(C), 112(C) are interleaved with optional fingerprint sensor surface 108(C) in a combined component within sensor surface 107(C). Such a configuration can be created in a sensor surface, where the pixels or data contact points that sense the fingerprint features are separately read from the sensors by a processor. For example, in a matrix of sensor pixels or data contact points, individual points can be singled out in one or more arrays to operate as motion sensing arrays. In the same matrix, the remaining pixels or data contact points can form a fingerprint sensor surface for sensing and capturing the fingerprint image. In operation, a fingerprint can be juxtaposed and moved along the sensor surface 107(C) along the anticipated axis of motion or at another angle, and an accurate sense and capture of a fingerprint can be achieved without undue computation and power load. While the fingerprint sensor surface 108(C) senses and captures the portions of images of the fingerprint features upon contact with the fingerprint surface 106, the motion sensors can simultaneously capture finger motion information as the features move past the motion sensors. The motion information can be used in combination with the portions of fingerprint images to reconstruct the fingerprint image. Alternatively, the fingerprint sensor 108(C can be absent or turned off, and the device used for "finger mouse" navigational purposed only.

Figure 5B:
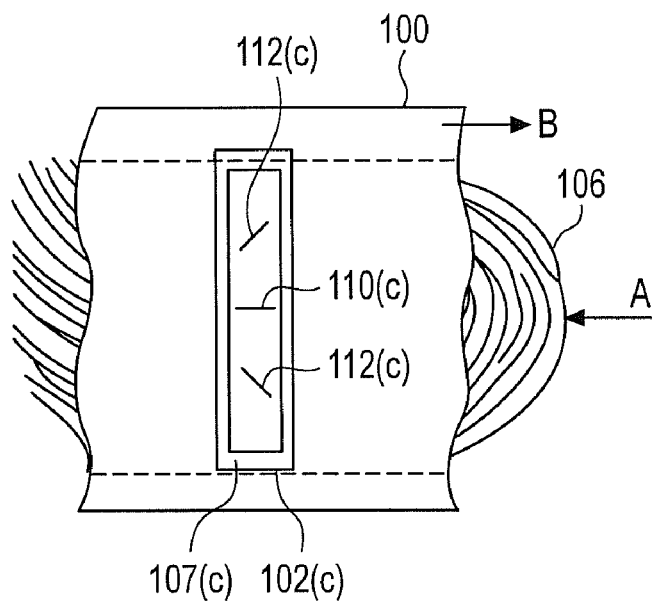
FIG. 5B shows a view of a finger moving over another alternate combination finger motion sensor and partial fingerprint imager. Here the finger motion sensor is equipped to sense finger motion in two dimensions.

Referring to FIG. 5B, the same configuration of FIG. 5A is illustrated, with a view of the motion sensors shown much smaller in comparison to the overall sensor surface. In a sensor surface that is densely populated with pixels or data contact points, the relative size of the portion of the sensor surface that is covered with the motion sensing arrays are very small compared to the pixels and data points that make up the fingerprint sensing surface 108(C), both located within sensor surface 107(C). Thus, the fingerprint can be sensed and captured without any interference by the interleaved motion sensing arrays and accurate portions of a fingerprint image can be captured and accurately reconstructed using the combined information from the fingerprint sensors and the motion sensors. Utilizing this embodiment, a universal component can be constructed and utilized for both motion detection and fingerprint capture. These motion sensors, which can sense both motion and direction, can also be used for navigation operations.

Figure 6:
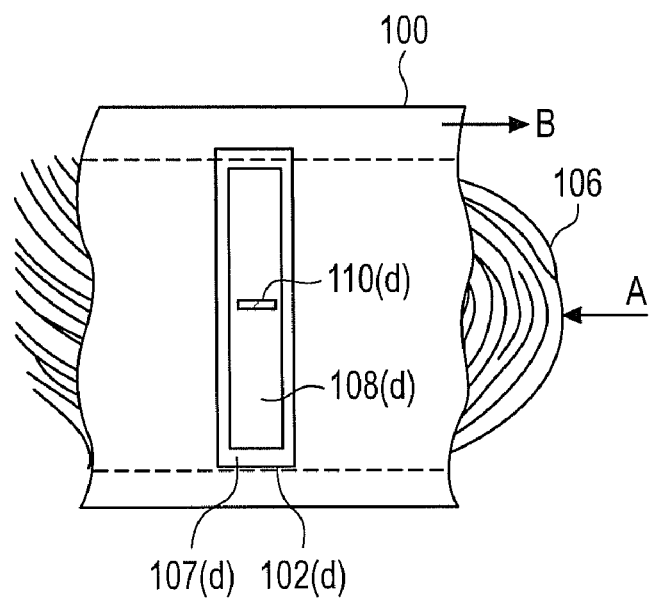
FIG. 6 shows a view of a finger moving over an alternate combination finger motion sensor and partial fingerprint imager.

Referring to FIG. 6, another embodiment 102(d) of the invention is illustrated, where a single motion sensor array 110(d) is interleaved within the fingerprint sensor surface 108(d) of sensor surface 107(d). Unlike the embodiment illustrated in FIGS. 5a, 5b, this embodiment is limited to one motion sensor array located along the anticipated axis of motion of the finger, which is anticipated to move in directions A, B with respect to the device 100. In operation, the interleaved sensor array 110(d) can sense and capture motion information regarding the motion of the finger across the sensor surface 107(d), while simultaneously fingerprint sensor surface 108(d) can sense and capture the fingerprint images for subsequent reconstruction. The information from both sensors can be used to more accurately reconstruct the fingerprint image. The information of both motion and direction can also be used for navigation operations.

Figure 7:
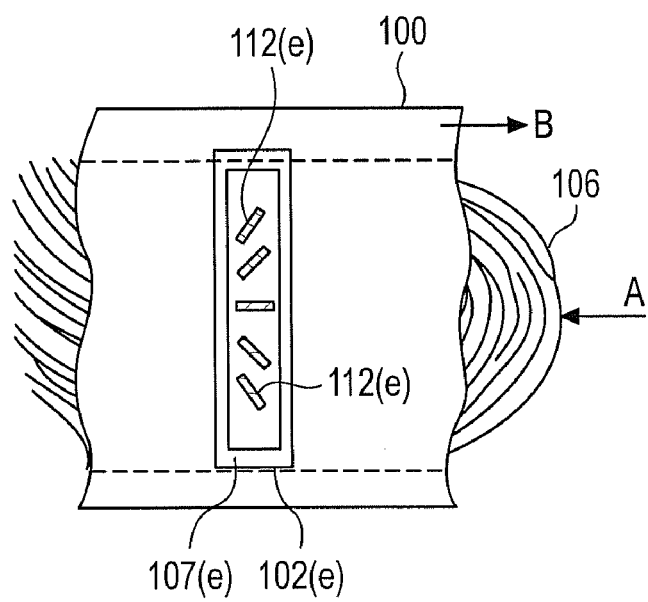
FIG. 7 shows a view of a finger moving over another alternate combination finger motion sensor and partial fingerprint imager. Here the finger motion sensor is equipped to sense finger motion in two dimensions.

Referring to FIG. 7, yet another embodiment 102(e) of the invention is illustrated, where multiple motion sensors 112(e) are interleaved within fingerprint sensor surface 108(e). This embodiment is similar to that illustrated in FIGS. 5a, 5b, but with more motion sensors at various angles. In operation, a fingerprint can be juxtaposed and moved along the sensor surface 107(e) along the anticipated axis of motion or at another angle, and an accurate sense and capture of a fingerprint can be achieved without undue computation and power load. While the fingerprint sensor surface 108(e) senses and captures the portions of images of the fingerprint features upon contact with the fingerprint surface 106, the motion sensors can simultaneously capture motion information as the features move past the motion sensors. The motion information can be used in combination with the portions of fingerprint images to reconstruct the fingerprint image.

If used for navigation purposes, of the motion sensor configurations above can be utilized for different navigation operations. For example, referring again to FIG. 3, the motion sensor 110(a) can be utilized on its own to sense motion in one axis of motion, for example in one direction. One application may be a sensor used for a power, volume or other audio control, where an up or down motion can be used to adjust the power, volume or other audio value. Here the motion sensor 110(a) can be used on a stand alone basis, and the fingerprint scanner 108(a) can be either turned off or absent.

Another application for the invention is the implementation of a scroll function for lists of data or text in a GUI. Precise power control over a range may be useful in manufacturing environments, where small changes in power can greatly affect a process. Another application may be to operate a medical instrument where accuracy is useful to the device's operation.

Computer-mouse-like navigation requires ability to sense motion in two dimensional space, where motion and direction information are required. Referring again to FIG. 4, a separate motion sensor 110(b) is illustrated for individual sensing of motion and direction, where distance, time expended over the distance (allowing for calculation of velocity), and direction can be calculated. Though this motion information can be used to enable better processing and reconstruction of fingerprint images as discussed above, as previously discussed, it can be used separately for navigation, making it a navigation sensor. In operation, the separate motion sensor can detect motion and direction, giving information required for navigation functions. In operation, a navigation sensor can consistently computing the matches for the various axes, generating motion and direction information as a fingerprint moves about a sensor.

Thus, if a user would stroke a fingerprint surface against a motion sensor surface, the arrays could pick up the motion and direction information, and a processor could process the information to generate relative motion and direction information for use in navigation, such as for a computer mouse. In this example, a user can move a finger relative to a cursor on a graphical user interface (GUI), such as a computer screen, a cellular phone, a personal data assistant (PDA) or other personal device. The navigation sensor could then cause the cursor to move relative to the fingerprint motion, and a user can navigate across the GUI to operate functions on a computer or other device. Since the motion of the cursor is relative to the movement of the fingerprint surface against the navigation sensor, relatively small movements can translate to equal, lesser or even greater distance movement of the cursor.

Figure 8A:
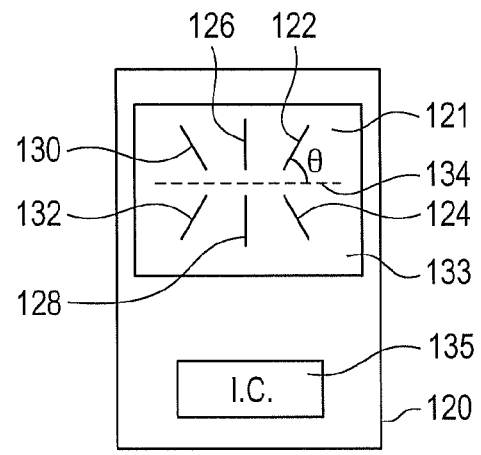
FIG. 8A shows that the integrated circuit chip used to drive the finger motion detector arrays may be mounted on a flexible circuit or film some distance away from the actual finger motion detector arrays. Here the finger motion detectors are configured to detect finger motion in two dimensions.

Referring to FIG. 8A, another embodiment of the invention is illustrated, where multiple arrays are located on the sensor surface to allow for sensing and capturing motion and direction information in different directions of fingerprint travel for use in navigation applications and other applications. The base film or circuit (120), which may be a flexible electronic circuit other material, includes a sensor surface (121) having several motion sensor arrays. Suitable materials for this base film or circuit were described in application Ser. No. 11/243,100, the contents of which are incorporated herein by reference. The overall concept here is similar to the three sensor array previously illustrated in FIG. 5A.

In the present example, there are three sensors that fan upward for detecting motion and direction. In operation, a user typically will stroke over the sensor in a downward direction, and the three sensors can determine the direction and speed using vector analysis. However, it may be desired to account for motion in either an upward or downward direction, and multiple sensors in either direction would be useful to better capture the information. From an orientation of a user facing the sensor illustrated in FIG. 8(a), the right sensors (122), (124) face the right, and are configured to capture movement toward the right, where either sensor could capture movement motion from the upper right to the lower left, and from the upper left to the lower right. Sensors (126), (128) could capture up or down movement, and sensors (130), (132) face the left, and are configured to capture movement toward the right, where either sensor could capture movement motion from the upper right to the lower left. Utilizing the multiple sensors, a sensor would be more robust, capable of sensing more fingerprint features, and also able to process more movement and directional information for use in capturing and reconstructing fingerprint images or for other applications such as navigation. The angle occurring between sensor (121) and center horizontal line (134) can be any angle, such as 30, 45 or 22.5 degrees in order to most effectively capture movement that is not aligned with center sensors (126), (128). All off-axis sensors (124), (128), (130), (132) can be set at various angles, which can depend on a particular application.

Figure 8B:
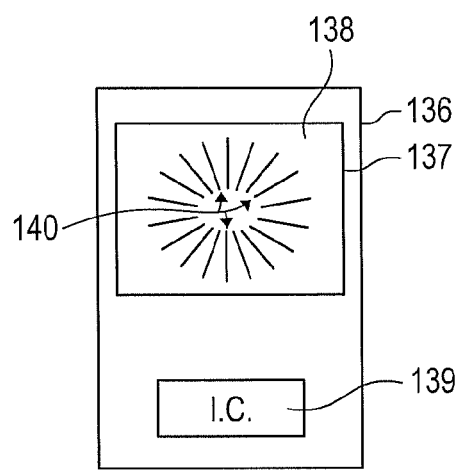
FIG. 8B shows that the integrated circuit chip used to drive the finger motion detector arrays may be mounted on a flexible circuit or film some distance away from the actual finger motion detector arrays. Here the finger motion detectors are configured in an alternate configuration to detect finger motion in two dimensions.

Referring to FIG. 8B, an even more robust example of a sensor set on flexible circuit (136) having a surface (137) located on the circuit. The sensor (138) is located on the circuit surface (137), and includes multiple array sensors (140) that are set at various angles. In this embodiment, each array may be set at 22.5 degrees from adjacent angles, providing a wide variety of angles at which to sense and capture motion information. The sensor, similar to that of FIGS. 8(a) and 2B, has an IC chip (139) that is separate from the sensor surface (138), similar to the configurations previously discussed in application Ser. No. 11/243,100, the contents of which are incorporated herein by reference.

Figure 8C:
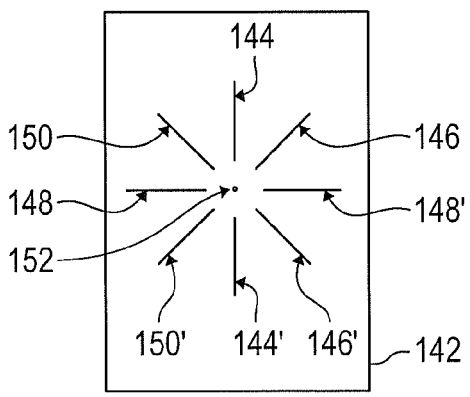
FIG. 8C shows that the integrated circuit chip used to drive the finger motion detector arrays may be mounted on a flexible circuit or film some distance away from the actual finger motion detector arrays. Here the finger motion detectors are configured in an alternate configuration to detect finger motion in two dimensions.

Referring to FIG. 8C, a diagrammatic view of multiple array sensors located on a sensor (142) is illustrated. Sensors (144), (144') are vertical arrays that are set to capture one axis of motion. Sensors (146), (146') and (150), (150') are located off axis at an angle to sensors (144), (144'). Sensors (148), (148') are optional and may be used in conjunction with the other sensors to gather motion information in a horizontal direction with respect to the vertical sensors. In practice, either or all of these sensors can be utilized by a system to accurately sense and capture motion and direction information in multiple directions. Again, which sensors to use may depend on a particular application and configuration.

In one embodiment, in order to support motion at any arbitrary angle, sensor arrays may be oriented at approximately 0, 30, 60, 90, 120, and 150 degrees. Another more robust system might space them at 22.5 degree increments, rather than 30. Once motion reaches 180 degrees, the process can use reverse motion on the zero degree sensor array, and so on. As previously discussed, a device configured in this way would have some of the properties of a navigation touchpad such as those used in laptop computers, with the relative motion sensing capability of a computer mouse.

Figure 9:
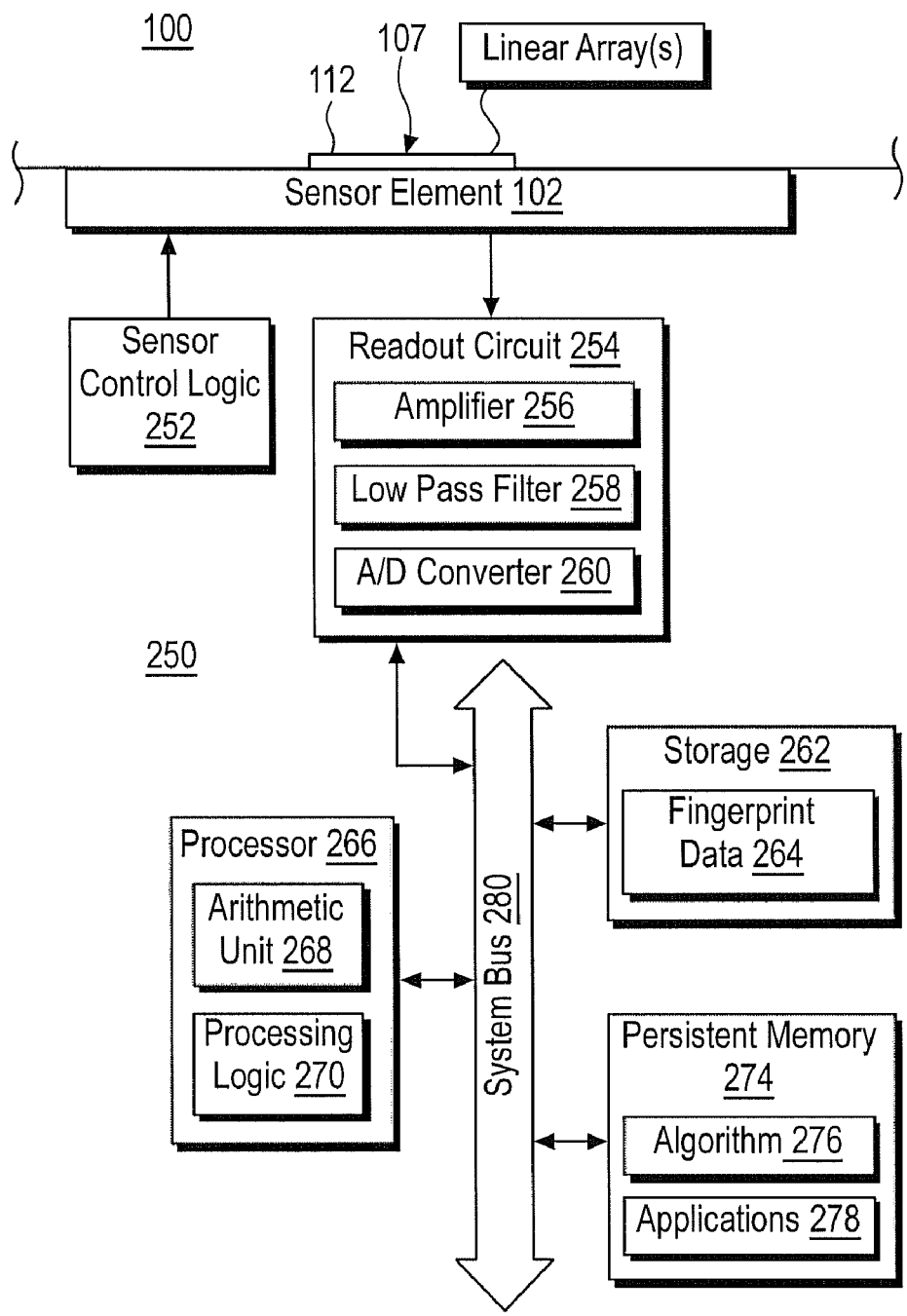
FIG. 9 shows an example of some of the circuitry used to read a finger motion sensor.

Such finger motion sensors will often be deep finger penetrating radio frequency (RF) based sensors, as previously discussed in U.S. Pat. Nos. 7,099,496; 7,146,024; and U.S. patent application Ser. Nos. 11/107,682; 11/112,338; 11,243,100; 11/184,464; however alternative sensing techniques (optical sensors, etc.) may also be used. The circuitry used to drive such sensors was previously shown in partial detail in FIG. 1A, and is now shown with additional detail in FIG. 9.

As before, the overall device (100) is one or more sensor elements composed of linear arrays of finger position sensing plates, and other optional sensors such as fingerprint imaging sensors. The finger position sensing plates will usually be activated or scanned by sensor control logic (252), which will send electrical signals, to the sensing plates in some sort of rapid scanning order. Control logic (252) may also control power, reset control of the sensor pixels or data contact points, control the output signal, control light sources or cooling (if an optical sensor is used), or perform other standard control functions. The output from these plates will in turn be detected by a readout circuit (254). This readout circuit is usually controlled by an amplifier (256) to detect and amplify the electrical signal from a particular plate. This signal is normally affected by the presence or absence of a finger. The output from amplifier (258) will often then be filtered with a low pass filter (258) to reduce ambient electrical noise, and will normally then be digitized by an analog to digital converter (260). This data will then normally be transmitted by a communications link, such as a system bus (280), serial link, parallel link, or some other data transmission means to other processing devices for further analysis.

The readout circuit (254) may store the output signal (data) in storage (262). If fingerprint images are obtained, the fingerprint data (264) is stored and preserved, either temporarily until the processor (266) can process the data, or for later use by the processor as needed. The processor (266) includes arithmetic unit (268) configured to process algorithms used for navigation of a cursor, such as those described in connection with navigation features of FIG. 2B, and for optional reconstruction of fingerprints. Processing logic 270 is configured to process information and includes other logic utilized by a processor. Persistent memory (274) is used to store algorithms (276) and software applications (278) that are used by the processor for the various functions described above, and in more detail below. Software applications (278) can include applications that use the finger movement information provided by the finger position sensors to control various computerized functions, such as moving a cursor, activating menus, controlling system parameter settings, and the like.

Figure 10:
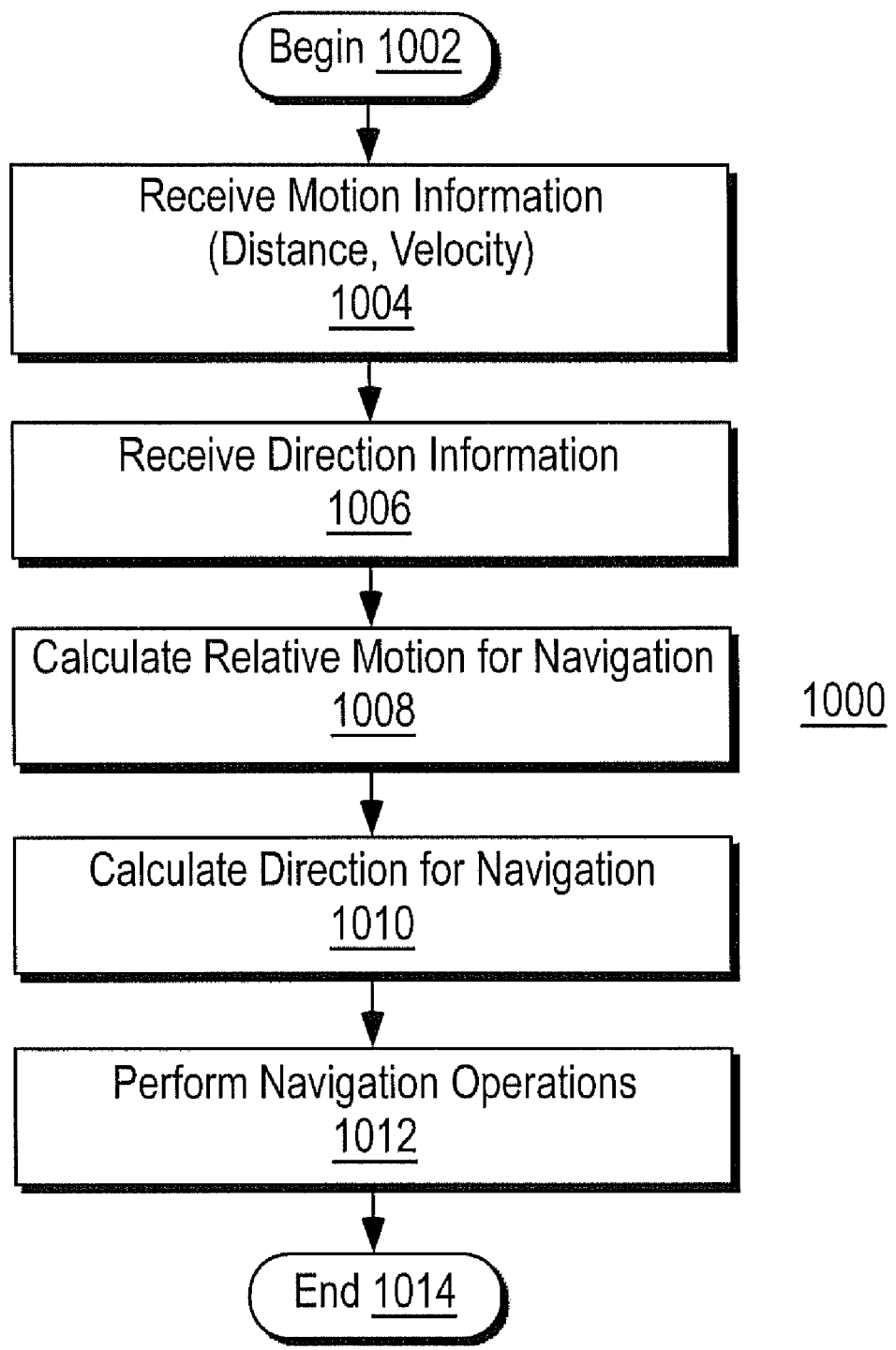
FIG. 10 shows an example of an algorithm used to transform finger motion data into navigational commands for a computerized device.

Referring to FIG. 10, a flow chart (1000) of one embodiment of a navigation sensor operation algorithm is illustrated. The process begins at step (1002), and, in step (1004), motion information is received, such as distance, time and velocity information. In step (1006), direction information is received from the sensors. In step (1008), relative motion for navigation is calculated by a processor. In step (1010), direction information for navigation is calculated. And, in step (1012), navigation operations are performed. The process ends at step (1014). This algorithm will often be stored in persistent memory FIG. 9, (276).

Figure 11:
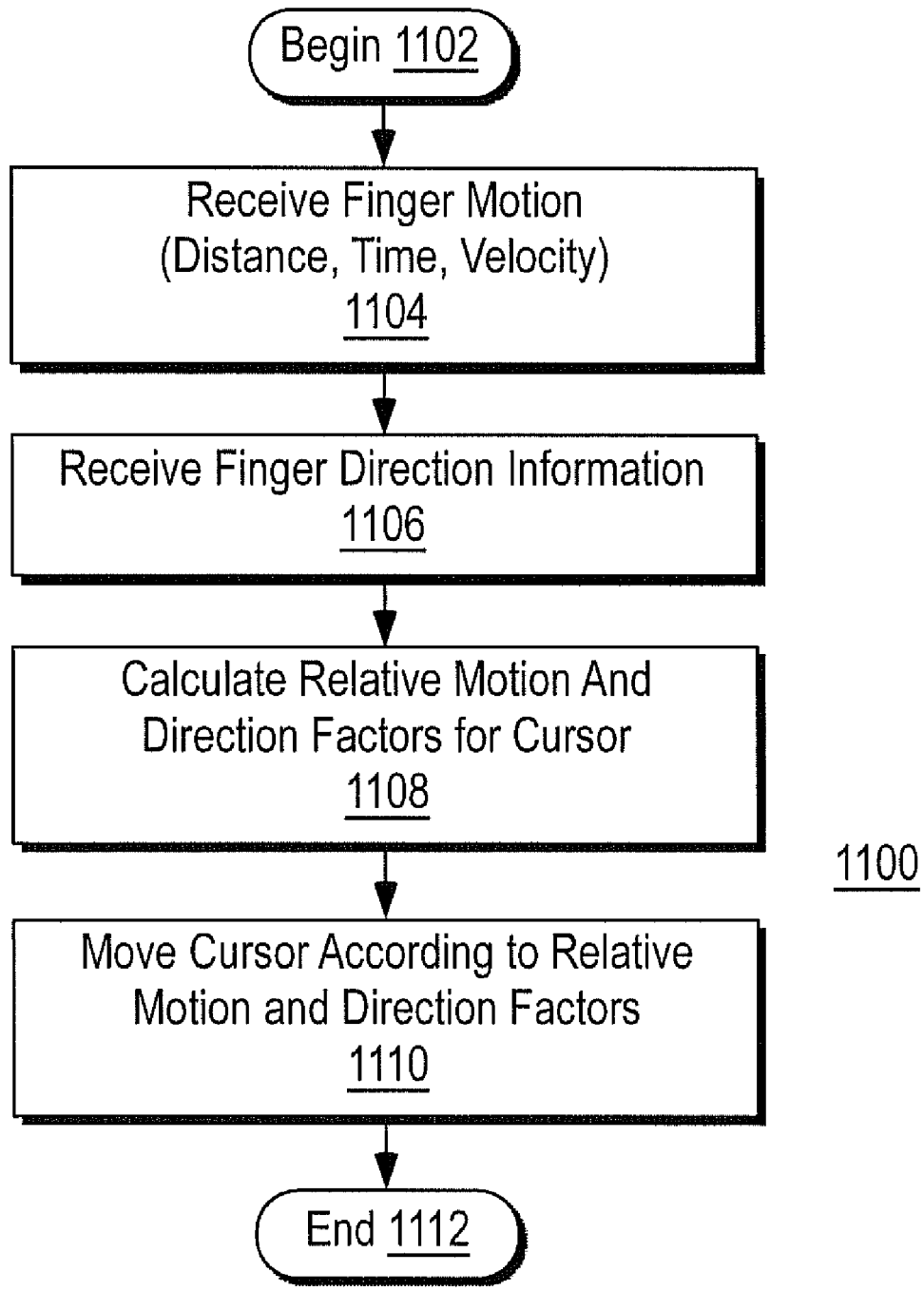
FIG. 11 shows an example of an algorithm used to transform finger motion data into cursor motion commands for a computerized device with a display screen.

More specifically, the navigation sensor operation algorithm can be used as is a finger mouse cursor control algorithm and this more specific case is shown in FIG. 11 (1100). As before, the process begins in step (1102), and in step (1104) finger motion information is received, such as finger distance, time and velocity. In step (1106), finger direction information is received. In step (1108), relative motion and direction factors are calculated for use in operating the cursor. In step (1110), the cursor is moved according to the relative motion and direction factors calculated in step (1110). The process ends in step (1112).

The invention may also involve a number of functions to be performed by a computer processor, such as a microprocessor. The microprocessor may be a specialized or dedicated microprocessor that is configured to perform particular tasks by executing machine-readable software code that defines the particular tasks. The microprocessor may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of computers, such as computer servers, that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. The invention is not limited to any particular type of memory device, or any commonly used protocol for storing and retrieving information to and from these memory devices respectively.

The apparatus and method include a method and apparatus for enabling and controlling fingerprint sensors and fingerprint image data and motion data in conjunction with the operation of an electronic device where navigation and fingerprint verification processes are utilized. Although this embodiment is described and illustrated in the context of devices, systems and related methods of imaging fingerprints and navigation features for a portable device, the scope of the invention extends to other applications where such functions are useful. Furthermore, while the foregoing description has been with reference to particular embodiments of the invention, it will be appreciated that these are only illustrative of the invention and that changes may be made to those embodiments without departing from the principles of the invention.

The invention claimed is:

1. A finger motion tracking apparatus used to provide user input to a computing_device, comprising:
    at least two linear sensor arrays each configured to sense overlapping line segments of features of a fingerprint of a finger moving along a one of at least two axes of motion of the finger, each linear sensor array including a plurality of linear sensor array sensing elements configured to capture segments of fingerprint image data, at least one of the at least two axes of motion being in a direction other than a direction of a swipe of the finger surface over the sensor surface, the overlapping line segments of the features of the fingerprint image each being sensed at different times;
    a memory configured to receive and store image data from each linear sensor array; and a computing device configured to generate finger motion data by comparing overlapping line segments of the fingerprint image that match each other, sensed by one of the at least two linear sensor arrays at different times, thereby determining a velocity of finger motion along each of the at least two axes of motion of the finger;

wherein the at least two linear sensor arrays are each present on the same unitized electrical component.

2. The apparatus of claim 1, wherein the apparatus is configured to use data collected from at least one of the at least two finger position sensor arrays to control the creation of a complete fingerprint image from partial fingerprint images collected using at least one partial fingerprint sensor.

3. The apparatus of claim 2, wherein the at least one finger position sensor array and the at least one partial fingerprint imager are driven by the same integrated circuit chip.

4. The apparatus of claim 2, wherein at least one of the at least one finger position sensor array or the at least one of the partial fingerprint imager are deep finger penetrating radio frequency (RF) based sensors.

5. The apparatus of claim 2, wherein there are a plurality of the at least one partial fingerprint imagers, and in which the orientation of at least some of the partial fingerprint imagers are different from the others, whereby when a finger is swiped at an arbitrary two dimensional angle an adequate fingerprint image is obtained.

6. The apparatus of claim 2, wherein both the at least one finger position sensor array and the at least one partial fingerprint imager are located on the same flexible support, and an integrated circuit that drives at least some of the finger position sensor arrays and at least some of the partial fingerprint imagers is located on the same flexible support.

7. The apparatus of claim 2, in which outputs from the apparatus include at least two spatial dimensions of finger position or finger motion data, and the partial fingerprint images from at least one partial fingerprint imager.

8. The apparatus of claim 7, wherein at least one of the finger position sensor arrays is a linear array of electrically conducting plates, and in which at least one of the partial finger print imagers produces a one dimensional partial image of a fingerprint.

9. The apparatus of claim 1, wherein there are a plurality of the at least one finger position sensor arrays, and in which the orientation of at least some of the finger position sensor arrays are different from the others, whereby two dimensional finger motion or location information is obtained.

10. The apparatus of claim 1, in which outputs from the apparatus include at least two spatial dimensions of finger position or finger motion data.

11. A finger motion tracking apparatus used to provide a user input to_a computing device comprising:
at least two linear sensor arrays configured to sense overlapping line segments of features of a fingerprint of a finger moving along one of at least two axes of motion of the finger, each linear sensor array including a plurality of linear sensor array sensing elements configured to capture segments of fingerprint image data, at least one of the at least two axes of motion being in a direction other than a direction of a swipe of the finger surface over the sensor surface, the overlapping line segments of the features of the fingerprint image each being sensed at different times;
a memory configured to receive and store image data from each linear sensor array; and
a computing device configured to generate finger motion data by comparing overlapping line segments of the fingerprint image that match each other, sensed by one of the at least two linear sensor arrays at different times, thereby determining a velocity of finger motion along each of the at least two axes of motion of the finger.

12. An apparatus according to claim 11, wherein the linear sensor array is configured to sense at least two overlapping line segments of fingerprint data, including a first overlapping line segment and a subsequently sensed second overlapping line segment; and wherein the computing device is configured to generate motion data based on an amount of shift between the first overlapping line segment and the subsequently sensed second overlapping line segment and navigation data based on the amount of shift in each of the at least two axes.

13. An apparatus according to claim 12, wherein the user input moves a cursor on a graphical user interface.

14. An apparatus according to claim 11, wherein the motion data includes velocity data and directional data.

15. The apparatus according to claim 11, wherein the linear sensor array is configured to sense a first set of features of a fingerprint along a first axis of finger motion and to generate a first set of image data captured by a plurality of sensors in the linear sensor array and to subsequently sense a second set of features of the fingerprint along the first axis of finger motion and to generate a second set of image data captured by the plurality of sensors in the linear sensor array, and wherein the computing device is configured to compare the first set and the second set of image data to determine the distance traveled by the finger over a time interval, and wherein the distance and time interval are used to calculate navigational data for navigating the cursor on the graphical user interface.

16. The apparatus according to claim 11, further comprising the second of the at least two linear sensor arrays configured to sense features of the fingerprint along the second of the at least two axes and to generate directional image data captured by a plurality of sensors, wherein the computing device is configured to produce navigation data using the motion data along the second of the at least two axes of motion.

17. The apparatus according to claim 11, further comprising at least a second linear sensor array aligned along a second axis of the at least two axes of motion and configured to sense features of a fingerprint and to generate directional image data captured by a plurality of sensors for use in providing user input for the navigation of an object responsive to the motion of a finger across the sensor surface.

18. The apparatus according to claim 11, wherein the computing device is configured to use at least one of the motion data and the navigation data to assemble fingerprint image portions.

19. A method of tracking motion of a fingerprint with respect to a sensor surface for use in a user input to computing device comprising:
sensing at least two overlapping line segments of a fingerprint image, each located along one of at least two axes of motion of the finger surface with respect to the sensor surface, at least one of the at least two axes of motion being in a direction other than a direction of a swipe of the finger surface over the sensor surface, the overlapping line segments of the fingerprint image each being sensed at different times;
storing digital data corresponding to the at least two overlapping line segments sensed by the sensing elements; and
processing the digital data to generate fingerprint motion data by comparing overlapping line segments of the fingerprint image that match each other, sensed by one of the at least two linear sensor array at different times, thereby determining a velocity of finger motion along each of the at least two axes of motion of the finger, and navigation data based on the amount of shift in each of the at least two axes.

20. A method according to claim 19, further comprising:
comparing digital data of a first overlapping line segment with subsequently sensed digital data of a second overlapping line segment;
determining the amount of shift between the first overlapping line segment and the subsequently sensed second overlapping line segment to determine the distance traveled by the finger across the sensor surface in the direction of the one of the at least two axes; and
generating navigation data from the amount of shift.

21. A method according to claim 20, further comprising:
estimating an estimated distance traveled by the finger surface with respect to the sensor surface in the direction of the one of the at least two axes by multiplying the amount of pixel shift detected times the pitch of the sensor pixels in the line segment of the sensor; and
computing the velocity of the finger surface with respect to the sensor surface by dividing the estimated distance by a time between the sensing of the first overlapping line segment and the second overlapping line segment in the direction of the one of the at least two axes.

22. A method according to claim 20, further comprising:
estimating a distance traveled by the finger surface with respect to the sensor surface by multiplying the pixel shift detected between the first overlapping line segment and the second overlapping line segment in the direction of the one of the at least two axes times the pitch of the pixels in the direction of the one of the at least two axes; and
computing the velocity of the finger surface with respect to the sensor surface by dividing the estimated distance by the time between the sensing of the first overlapping line segment and the sensing of the second overlapping line segment.

23. A tangible machine readable medium storing instructions that, when executed by a computing device, cause the computing device to perform a method, the method comprising:
tracking motion of a fingerprint with respect to a sensor for use in a user input to a computing device comprising:
sensing at least two overlapping line segments of a fingerprint image, each located along one of at least two axes of motion of the finger surface with respect to a sensor surface, at least one of the at least two axes of motion being in a direction other than a direction of a swipe of the finger surface over the sensor surface, the overlapping line segments of the fingerprint image being sensed at different times;
storing digital data corresponding to the at least two overlapping line segments sensed by the sensing elements; and
processing the digital data to generate fingerprint motion data by comparing overlapping line segments of the fingerprint image, that match each other, taken by one of the linear sensor arrays at different times, thereby determining a velocity of finger motion along each of the at least two axes of motion of the finger, and navigation data based on the amount of shift in each of the at least two axes.

24. The machine readable medium of claim 23, the method further comprising:
comparing digital data of a first overlapping line segment with subsequently sensed digital data of a second overlapping line segment;
determining the amount of shift between the first overlapping line segment and the subsequently sensed second overlapping line segment to determine the distance traveled by the finger across the sensor surface in the direction of one of the at least two axes; and
generating navigation data from the amount of shift.

25. A machine readable medium of claim 24, the method further comprising:
estimating an estimated distance traveled by the finger surface with respect to the sensor surface in the direction of one of the at least two axes by multiplying the amount of pixel shift detected times the pitch of the sensor pixels in the line segment of the sensor; and
computing the velocity of the finger surface with respect to the sensor surface by dividing the estimated distance by a time between the sensing of the first overlapping line segment and the sensing of the second overlapping line segment in the direction of one of the at least two axes.

26. A machine readable medium of claim 24, the method further comprising:
estimating a distance traveled by the finger surface with respect to the sensor surface by multiplying the pixel shift detected between the first overlapping line segment and the second overlapping line segment in the direction of the one of the at least two axes times the pitch of the pixels in the direction of the one of the at least two axes; and
computing the velocity of the finger surface with respect to the sensor surface by dividing the estimated distance by the time between the sensing of the first overlapping line segment and the sensing of the second overlapping line segment.

* * * * *